(12) United States Patent
Weber

(10) Patent No.: US 11,037,140 B2
(45) Date of Patent: *Jun. 15, 2021

(54) METHOD AND SYSTEM FOR CORRELATING DIVERSE TRANSACTION DATA

(71) Applicant: Visa International Service Association, San Francisco, CA (US)

(72) Inventor: Lance Weber, Longmont, CO (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 16/378,377

(22) Filed: Apr. 8, 2019

(65) Prior Publication Data

US 2019/0236596 A1 Aug. 1, 2019

Related U.S. Application Data

(63) Continuation of application No. 15/354,891, filed on Nov. 17, 2016, now Pat. No. 10,296,904, which is a
(Continued)

(51) Int. Cl.
*G06Q 20/20* (2012.01)
*G06Q 20/38* (2012.01)
(Continued)

(52) U.S. Cl.
CPC ......... *G06Q 20/385* (2013.01); *G06Q 20/02* (2013.01); *G06Q 20/102* (2013.01); *G06Q 20/20* (2013.01);
(Continued)

(58) Field of Classification Search
None
See application file for complete search history.

(56) References Cited

U.S. PATENT DOCUMENTS 5,613,012 A 3/1997 Hoffman
5,781,438 A 7/1998 Lee
(Continued)

FOREIGN PATENT DOCUMENTS

EP 2156397 A1 2/2010
WO 2001035304 A1 5/2001
(Continued)

OTHER PUBLICATIONS

Payformance offers further fraud protection to corporations through support of universal payment identification code (UPIC). (Oct. 16, 2006). Business Wire Retrieved from https://dialog.proquest.com/professional/docview/1062669004?accountid=131444 on Feb. 17, 2021 (Year: 2006).*
(Continued)

*Primary Examiner* — Kito R Robinson
(74) *Attorney, Agent, or Firm* — Kilpatrick Townsend & Stockton LLP

(57) ABSTRACT

Embodiments of the present invention are directed to methods, systems, and apparatuses for matching e-commerce and physical point-of-sale transaction data. In one embodiment, a method includes receiving, by a computer, first transaction data comprising a payment token or second transaction data comprising a primary account identifier, wherein the payment token is derived from the primary account identifier, and providing, by the computer, a universal account identifier after receiving the payment token or the account identifier, wherein the universal account identifier is a substitute for the payment token and the primary account identifier.

18 Claims, 6 Drawing Sheets

Related U.S. Application Data continuation of application No. 13/910,970, filed on Jun. 5, 2013, now Pat. No. 9,524,501.

(60) Provisional application No. 61/656,480, filed on Jun. 6, 2012.

(51) Int. Cl.
*G06Q 20/02* (2012.01)
*G06Q 20/10* (2012.01)
*G06Q 30/02* (2012.01)
*G06Q 20/04* (2012.01)

(52) U.S. Cl.
CPC .......... *G06Q 20/38* (2013.01); *G06Q 20/382* (2013.01); *G06Q 20/383* (2013.01); *G06Q 20/04* (2013.01); *G06Q 20/042* (2013.01); *G06Q 20/10* (2013.01); *G06Q 30/02* (2013.01); *G06Q 30/0207* (2013.01); *G06Q 30/0281* (2013.01); *G06Q 2220/00* (2013.01)

(56) References Cited

U.S. PATENT DOCUMENTS

| | | | |
|---|---|---|---|
| 5,883,810 | A | 3/1999 | Franklin |
| 5,953,710 | A | 9/1999 | Fleming |
| 5,956,699 | A | 9/1999 | Wong |
| 6,000,832 | A | 12/1999 | Franklin |
| 6,014,635 | A | 1/2000 | Harris |
| 6,044,360 | A | 3/2000 | Picciallo |
| 6,163,771 | A | 12/2000 | Walker |
| 6,173,272 | B1 | 1/2001 | Thomas |
| 6,227,447 | B1 | 5/2001 | Campisano |
| 6,236,981 | B1 | 5/2001 | Hill |
| 6,267,292 | B1 | 7/2001 | Walker |
| 6,317,745 | B1 | 11/2001 | Thomas |
| 6,327,578 | B1 | 12/2001 | Linehan |
| 6,341,724 | B2 | 1/2002 | Campisano |
| 6,385,596 | B1 | 5/2002 | Wiser |
| 6,422,462 | B1 | 7/2002 | Cohen |
| 6,425,523 | B1 | 7/2002 | Shem Ur |
| 6,592,044 | B1 | 7/2003 | Wong |
| 6,636,833 | B1 | 10/2003 | Flitcroft |
| 6,671,358 | B1 * | 12/2003 | Seidman ............... G06Q 20/04 379/91.01 |
| 6,748,367 | B1 | 6/2004 | Lee |
| 6,805,287 | B2 | 10/2004 | Bishop |
| 6,879,965 | B2 | 4/2005 | Fung |
| 6,891,953 | B1 | 5/2005 | DeMello |
| 6,901,387 | B2 | 5/2005 | Wells |
| 6,931,382 | B2 | 8/2005 | Laage |
| 6,938,019 | B1 | 8/2005 | Uzo |
| 6,941,285 | B2 | 9/2005 | Sarcanin |
| 6,980,670 | B1 | 12/2005 | Hoffman |
| 6,990,470 | B2 | 1/2006 | Hogan |
| 6,991,157 | B2 | 1/2006 | Bishop |
| 7,051,929 | B2 | 5/2006 | Li |
| 7,059,517 | B2 | 6/2006 | Hopkins |
| 7,069,249 | B2 | 6/2006 | Stolfo |
| 7,103,576 | B2 | 9/2006 | Mann, III |
| 7,113,930 | B2 | 9/2006 | Eccles |
| 7,136,835 | B1 | 11/2006 | Flitcroft |
| 7,177,835 | B1 | 2/2007 | Walker |
| 7,177,848 | B2 | 2/2007 | Hogan |
| 7,194,437 | B1 | 3/2007 | Britto |
| 7,209,561 | B1 | 4/2007 | Shankar et al. |
| 7,264,154 | B2 | 9/2007 | Harris |
| 7,287,692 | B1 | 10/2007 | Patel |
| 7,292,999 | B2 | 11/2007 | Hobson |
| 7,350,230 | B2 | 3/2008 | Forrest |
| 7,353,382 | B2 | 4/2008 | Labrou |
| 7,379,919 | B2 | 5/2008 | Hogan |
| RE40,444 | E | 7/2008 | Linehan |
| 7,415,443 | B2 | 8/2008 | Hobson |
| 7,444,676 | B1 | 10/2008 | Asghari-Kamrani |
| 7,469,151 | B2 | 12/2008 | Khan |
| 7,548,889 | B2 | 6/2009 | Bhambri |
| 7,567,934 | B2 | 7/2009 | Flitcroft |
| 7,567,936 | B1 | 7/2009 | Peckover |
| 7,571,139 | B1 | 8/2009 | Giordano |
| 7,571,142 | B1 | 8/2009 | Flitcroft |
| 7,580,898 | B2 | 8/2009 | Brown |
| 7,584,153 | B2 | 9/2009 | Brown |
| 7,593,896 | B1 | 9/2009 | Flitcroft |
| 7,606,560 | B2 | 10/2009 | Labrou |
| 7,627,531 | B2 | 12/2009 | Breck |
| 7,627,895 | B2 | 12/2009 | Gifford |
| 7,650,314 | B1 | 1/2010 | Saunders |
| 7,685,037 | B2 | 3/2010 | Reiners |
| 7,702,578 | B2 | 4/2010 | Fung |
| 7,707,120 | B2 | 4/2010 | Dominguez |
| 7,712,655 | B2 | 5/2010 | Wong |
| 7,734,527 | B2 | 6/2010 | Uzo |
| 7,753,265 | B2 | 7/2010 | Harris |
| 7,770,789 | B2 | 8/2010 | Oder, II |
| 7,784,685 | B1 | 8/2010 | Hopkins, III |
| 7,793,851 | B2 | 9/2010 | Mullen |
| 7,801,826 | B2 | 9/2010 | Labrou |
| 7,805,376 | B2 | 9/2010 | Smith |
| 7,805,378 | B2 | 9/2010 | Berardi |
| 7,818,264 | B2 | 10/2010 | Hammad |
| 7,828,220 | B2 | 11/2010 | Mullen |
| 7,835,960 | B2 | 11/2010 | Breck |
| 7,841,523 | B2 | 11/2010 | Oder, II |
| 7,841,539 | B2 | 11/2010 | Hewton |
| 7,844,550 | B2 | 11/2010 | Walker |
| 7,848,980 | B2 | 12/2010 | Carlson |
| 7,849,020 | B2 | 12/2010 | Johnson |
| 7,853,529 | B1 | 12/2010 | Walker |
| 7,853,995 | B2 | 12/2010 | Chow |
| 7,865,414 | B2 | 1/2011 | Fung |
| 7,873,579 | B2 | 1/2011 | Hobson |
| 7,873,580 | B2 | 1/2011 | Hobson |
| 7,890,393 | B2 | 2/2011 | Talbert |
| 7,891,563 | B2 | 2/2011 | Oder, II |
| 7,896,238 | B2 | 3/2011 | Fein |
| 7,908,216 | B1 | 3/2011 | Davis et al. |
| 7,922,082 | B2 | 4/2011 | Muscato |
| 7,931,195 | B2 | 4/2011 | Mullen |
| 7,938,318 | B2 | 5/2011 | Fein |
| 7,954,705 | B2 | 6/2011 | Mullen |
| 7,959,076 | B1 | 6/2011 | Hopkins, III |
| 7,996,288 | B1 | 8/2011 | Stolfo |
| 8,025,223 | B2 | 9/2011 | Saunders |
| 8,046,256 | B2 | 10/2011 | Chien |
| 8,060,448 | B2 | 11/2011 | Jones |
| 8,060,449 | B1 | 11/2011 | Zhu |
| 8,074,877 | B2 | 12/2011 | Mullen |
| 8,074,879 | B2 | 12/2011 | Harris |
| 8,082,210 | B2 | 12/2011 | Hansen |
| 8,095,113 | B2 | 1/2012 | Kean |
| 8,104,679 | B2 | 1/2012 | Brown |
| RE43,157 | E | 2/2012 | Bishop |
| 8,109,436 | B1 | 2/2012 | Hopkins, III |
| 8,121,942 | B2 | 2/2012 | Carlson |
| 8,121,956 | B2 | 2/2012 | Carlson |
| 8,126,449 | B2 | 2/2012 | Beenau |
| 8,171,525 | B1 | 5/2012 | Pelly |
| 8,196,813 | B2 | 6/2012 | Vadhri |
| 8,205,791 | B2 | 6/2012 | Randazza |
| 8,219,489 | B2 | 7/2012 | Patterson |
| 8,224,702 | B2 | 7/2012 | Mengerink |
| 8,225,385 | B2 | 7/2012 | Chow |
| 8,229,852 | B2 | 7/2012 | Carlson |
| 8,249,957 | B2 | 8/2012 | Mullen et al. |
| 8,265,993 | B2 | 9/2012 | Chien |
| 8,280,777 | B2 | 10/2012 | Mengerink |
| 8,281,991 | B2 | 10/2012 | Wentker et al. |
| 8,328,095 | B2 | 12/2012 | Oder, II |
| 8,336,088 | B2 | 12/2012 | Raj et al. |
| 8,346,666 | B2 | 1/2013 | Lindelsee et al. |
| 8,376,225 | B1 | 2/2013 | Hopkins, III |
| 8,380,177 | B2 | 2/2013 | Laracey |
| 8,387,873 | B2 | 3/2013 | Saunders |

(56) References Cited

U.S. PATENT DOCUMENTS

| | | |
|---|---|---|
| 8,401,539 B2 | 3/2013 | Beenau |
| 8,401,898 B2 | 3/2013 | Chien |
| 8,402,555 B2 | 3/2013 | Grecia |
| 8,403,211 B2 | 3/2013 | Brooks |
| 8,407,142 B1 | 3/2013 | Griggs |
| 8,412,623 B2 | 4/2013 | Moon |
| 8,412,837 B1 | 4/2013 | Emigh |
| 8,417,642 B2 | 4/2013 | Oren |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,475 B2 | 8/2013 | Brand et al. |
| 8,504,478 B2 | 8/2013 | Saunders |
| 8,510,816 B2 | 8/2013 | Quach |
| 8,533,860 B1 | 9/2013 | Grecia |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,762,263 B2 | 6/2014 | Gauthier et al. |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0062249 A1 | 5/2002 | Iannacci |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0139657 A1 | 6/2005 | Hopkins |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0235795 A1 | 10/2006 | Johnson |
| 2006/0237528 A1 | 10/2006 | Bishop |
| 2006/0278704 A1 | 12/2006 | Saunders |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0150411 A1 | 6/2007 | Addepalli |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0097783 A1 | 4/2008 | Iannacci |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0076938 A1* | 3/2009 | Patterson ............... G06Q 30/04 705/35 |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |

(56) References Cited

U.S. PATENT DOCUMENTS

| | | |
|---|---|---|
| 2010/0008535 A1 | 1/2010 | Abulafia |
| 2010/0030688 A1* | 2/2010 | Patterson .......... G06Q 20/0855 705/44 |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 | 9/2010 | Moore |
| 2010/0258620 A1 | 10/2010 | Torreyson |
| 2010/0291904 A1 | 11/2010 | Musfeldt |
| 2010/0299267 A1 | 11/2010 | Faith et al. |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0035278 A1 | 2/2011 | Fordyce, III et al. |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0099073 A1 | 4/2011 | Yigit |
| 2011/0125597 A1 | 5/2011 | Oder, II |
| 2011/0153437 A1 | 6/2011 | Archer |
| 2011/0153498 A1 | 6/2011 | Makhotin et al. |
| 2011/0154466 A1 | 6/2011 | Harper |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0028609 A1 | 2/2012 | Hruska |
| 2012/0030047 A1 | 2/2012 | Fuentes et al. |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0209672 A1 | 8/2012 | Winner et al. |
| 2012/0215584 A1 | 8/2012 | Narsude et al. |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1* | 12/2012 | Bower .................. G06Q 20/02 705/75 |
| 2013/0013430 A1 | 1/2013 | Roberts |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder ("J.D."), II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191286 A1 | 7/2013 | Cronic |
| 2013/0191289 A1 | 7/2013 | Cronic |
| 2013/0197986 A1 | 8/2013 | Roberts |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0238492 A1 | 9/2013 | Muthu |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |

(56) References Cited

U.S. PATENT DOCUMENTS

| | | |
|---|---|---|
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074568 A1* | 3/2014 | Moscoe .................. H04L 51/28 705/14.3 |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0294701 A1 | 10/2014 | Dai et al. |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill |
| 2015/0032626 A1 | 1/2015 | Dill |
| 2015/0032627 A1 | 1/2015 | Dill |
| 2015/0046338 A1 | 2/2015 | Laxminarayanan |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0119296 A1 | 4/2016 | Laxminarayanan et al. |

FOREIGN PATENT DOCUMENTS

| | | | |
|---|---|---|---|
| WO | 2001035304 A9 | 5/2001 | |
| WO | 2004042536 A2 | 5/2004 | |
| WO | 2006113834 A2 | 10/2006 | |
| WO | 2009032523 A1 | 3/2009 | |
| WO | 2010079522 A1 | 7/2010 | |
| WO | 2012068078 A2 | 5/2012 | |
| WO | 2012098556 A1 | 7/2012 | |
| WO | 2012142370 A2 | 10/2012 | |
| WO | 2012167941 A1 | 12/2012 | |
| WO | 2013048538 A1 | 4/2013 | |
| WO | 2013056104 A1 | 4/2013 | |
| WO | 2013119914 A1 | 8/2013 | |
| WO | 2013179271 A2 | 12/2013 | |

OTHER PUBLICATIONS

Malhotra, P. (Aug. 13, 2002). Clearing house enumerates e-payment ills. American Banker Retrieved from https://dialog.proquest.com/professional/docview/249818571?accountid=131444 on Feb. 17, 2021 (Year: 2002).*

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.

Wang, U.S. Appl. No. 62/000,288 (unpublished), Payment System Canonical Address Format filed May 19, 2014.

Sharma et al., U.S. Appl. No. 62/003,717 (unpublished), Mobile Merchant Application filed May 28, 2014.

Kalgi et al., U.S. Appl. No. 62/024,426, (unpublished) Secure Transactions Using Mobile Devices filed Jul. 14, 2014.

Prakash et al., U.S. Appl. No. 62/037,033 (unpublished), Sharing Payment Token filed Aug. 13, 2014.

Hoverson et al., U.S. Appl. No. 62/038,174 (unpublished), Customized Payment Gateway filed Aug. 15, 2014.

Wang, U.S. Appl. No. 62/042,050 (unpublished), Payment Device Authentication and Authorization System filed Aug. 26, 2014.

Gaddam et al., U.S. Appl. No. 62/053,736 (unpublished), Completing Transactions Without a User Payment Device filed Sep. 22, 2014.

Patterson, U.S. Appl. No. 62/054,346 (unpublished), Mirrored Token Vault filed Sep. 23, 2014.

Dimmick, U.S. Appl. No. 14/952,514 (unpublished), Systems Communications With Non-Sensitive Identifiers filed Nov. 25, 2015.

Dimmick, U.S. Appl. No. 14/952,444 (unpublished), Tokenization Request Via Access Device filed Nov. 25, 2015.

Prakash et al., U.S. Appl. No. 14/955,716 (unpublished), Provisioning Platform for Machine-To-Machine Devices filed Dec. 1, 2015.

Wong et al., U.S. Appl. No. 14/966,948 (unpublished), Automated Access Data Provisioning filed Dec. 11, 2015.

(56) References Cited

OTHER PUBLICATIONS

Stubbs et al., U.S. Appl. No. 62/103,522 (unpublished), Methods and Systems for Wallet Provider Provisioning filed Jan. 14, 2015.
McGuire, U.S. Appl. No. 14/600,523 (unpublished), Secure Payment Processing Using Authorization Request filed Jan. 20, 2015.
Flurscheim et al., U.S. Appl. No. 15/004,705 (unpublished), Cloud-Based Transactions With Magnetic Secure Transmission filed Jan. 22, 2016.
Flurscheim et al., U.S. Appl. No. 62/108,403 (unpublished), Wearables With NFC HCE filed Jan. 27, 2015.
Sabba et al., U.S. Appl. No. 15/011,366 (unpublished), Token Check Offline filed Jan. 29, 2016.
Patterson, U.S. Appl. No. 15/019,157 (unpublished), Token Processing Utilizing Multiple Authorizations filed Feb. 9, 2016.
Cash et al., U.S. Appl. No. 15/041,495 (unpublished), Peer Forward Authorization of Digital Requests filed Feb. 11, 2016.
Le Saint et al., U.S. Appl. No. 15/008,388 (unpublished), Methods for Secure Credential Provisioning filed Jan. 27, 2016.
Kinagi, U.S. Appl. No. 62/117,291 (unpublished), Token and Cryptogram Using Transaction Specific Information filed Feb. 17, 2015.
Galland et al. U.S. Appl. No. 62/128,709 (unpublished), Tokenizing Transaction Amounts filed Mar. 5, 2015.
Rangarajan et al., U.S. Appl. No. 61/751,763 (unpublished), Payments Bridge filed Jan. 11, 2013.
Li, U.S. Appl. No. 61/894,749 (unpublished), Methods and Systems for Authentication and Issuance of Tokens in a Secure Environment filed Oct. 23, 2013.
Aissi et al., U.S. Appl. No. 61/738,832 (unpublished), Management of Sensitive Data filed Dec. 18, 2012.

Wong et al., U.S. Appl. No. 61/879,362 (unpublished), Systems and Methods for Managing Mobile Cardholder Verification Methods filed Sep. 18, 2013.
Powell, U.S. Appl. No. 61/892,407 (unpublished), Issuer Over-The-Air Update Method and System filed Oct. 17, 2013.
Powell, U.S. Appl. No. 61/926,236 (unpublished), Methods and Systems for Provisioning Mobile Devices With Payment Credentials and Payment Token Identifiers filed Jan. 10, 2014.
U.S. Bank UPIC(R) secure account identifier offers additional level of fraud security to business customers. (Mar. 6, 2006). Business Wire Retrieved from http://dialog.proquest.com/professional/docview/676375166?accountid=142257 on Jul. 21, 2016.
Payformance offers further fraud protection to corporations through support of universal payment identification code (UPIC). (Oct. 16, 2006). Business Wire Retrieved from http:/ldialog.proquest.com/professional/docview/671160771?accountid=142257 on Jul. 21, 2016.
AT&T Securebuy Service Makes It Safe and Easy to Buy and Sell on the Internet. (Oct. 8, 1996). Business Wire Retrieved from https://dialog.proquest.com/professional/docview/679514219?accountid= 142257 (Year: 1996).
UPIC pilot program addresses university ACH payments. (2004). Electronic Commerce News, 9(16), 0. Retrieved from https:// dialog.proquest.com/professional/docview/670261387?accountid= 142257 (Year: 2004).
U.S. Appl. No. 13/910,970 , Notice of Allowance, dated Aug. 10, 2016, 20 pages.
Thomas et al., "Electronic funds transfer method and system and bill presentment method and system", Patentes, CA 2329348 A1, Nov. 4, 1999.

\* cited by examiner

US 11,037,140 B2

METHOD AND SYSTEM FOR CORRELATING DIVERSE TRANSACTION DATA

CROSS-REFERENCES TO RELATED APPLICATIONS

This application is a continuation application of U.S. patent application Ser. No. 15/354,891, entitled 'METHOD AND SYSTEM FOR CORRELATING DIVERSE TRANSACTION DATA" filed Nov. 17, 2016, which is a continuation of U.S. patent application Ser. No. 13/910,970, entitled "METHOD AND SYSTEM FOR CORRELATING DIVERSE TRANSACTION DATA", filed Jun. 5, 2013, now U.S. Pat. No. 9,524,501, issued on Dec. 20, 2016 which is a non-provisional application and claims the benefit of priority under 35 U.S.C. § 119(e) to U.S. Provisional Patent Application No. 61/656,480, filed Jun. 6, 2012 entitled "METHOD AND SYSTEM FOR MATCHING E-COMMERCE AND PHYSICAL POINT OF SALE TRANSACTION DATA", which are herein incorporated by reference in their entirety for all purposes.

BACKGROUND

Today consumers have different ways to purchase goods or services from a particular merchant. For example, goods and services may be purchased from the merchant remotely over the Internet or may be purchased in person at a store operated by the merchant. The transaction data received through these different payment processes can be different. For example, the merchant may receive tokenized transaction data in an Internet transaction while the same merchant may receive non-tokenized transaction data when a transaction is conducted at the merchant's store.

"Tokenized data" may be data that is derived from real transaction data. Tokenized data obscures the real data such that the real data is not compromised if the tokenized data is fraudulently obtained. While the use of tokenized data obscures the real transaction data and is an effective way to combat fraud, the use of tokenized data presents other problems. For example, because the tokenized data is obscured, it is difficult if not impossible for the merchant to correlate the tokenized data to other transaction data that it may have. As an illustration, a merchant may wish to correlate a transaction that is represented by tokenized data to other transactions that are not represented by tokenized data to perform marketing or fraud analytics. By doing so, the merchant can review, analyze and/or process transaction data regardless of its original form.

Embodiments of the present invention solve these problems and other problems individually and collectively.

SUMMARY

Embodiments of the present invention are directed to methods, systems, and apparatuses for providing universal identifiers across a number of payment channels to allow merchants or other entities to identify consumer activity across a number of different payment methods, systems, and devices. For example, embodiments of the present invention may generate and provide a universal account identifier before, during, or after a payment transaction for transactions initiated using both e-commerce as well as point-of-sale channels.

One embodiment of the present invention is directed to a method. The method comprising receiving, by a computer, first transaction data comprising a payment token or second transaction data comprising a primary account identifier, wherein the payment token is derived from the primary account identifier, and providing, by the computer, a universal account identifier after receiving the payment token or the account identifier, wherein the universal account identifier is a substitute for the payment token and the primary account identifier.

Another embodiment is directed at a server computer comprising a processor and a computer-readable medium coupled to the processor, the computer-readable medium comprising code executable by the processor for performing a method. The method comprising receiving first transaction data comprising a payment token or second transaction data comprising a primary account identifier, wherein the payment token is derived from the primary account identifier, and providing a universal account identifier after receiving the payment token or the account identifier, wherein the universal account identifier is a substitute for the payment token and the primary account identifier.

Another embodiment is directed to a method comprising receiving, by a computer, e-commerce transaction data including a payment token from a merchant computer, determining, by the computer, a primary account identifier associated with the payment token and a universal account identifier associated with the primary account identifier, and sending, by the computer, the universal account identifier to the merchant computer. The merchant may further store the universal account identifier in a database comprising e-commerce transaction data and retail transaction data.

Another embodiment is directed to a server computer comprising a processor and a computer-readable medium coupled to the processor, the computer-readable medium comprising code executable by the processor for performing a method. The method comprising receiving e-commerce transaction data including a payment token from a merchant computer, determining a primary account identifier associated with the payment token and a universal account identifier associated with the primary account identifier, and sending the universal account identifier to the merchant computer. The merchant computer may store the universal account identifier in a database comprising e-commerce transaction data and retail transaction data.

These and other embodiments of the invention are described in detail below.

DETAILED DESCRIPTION

Figure 1:
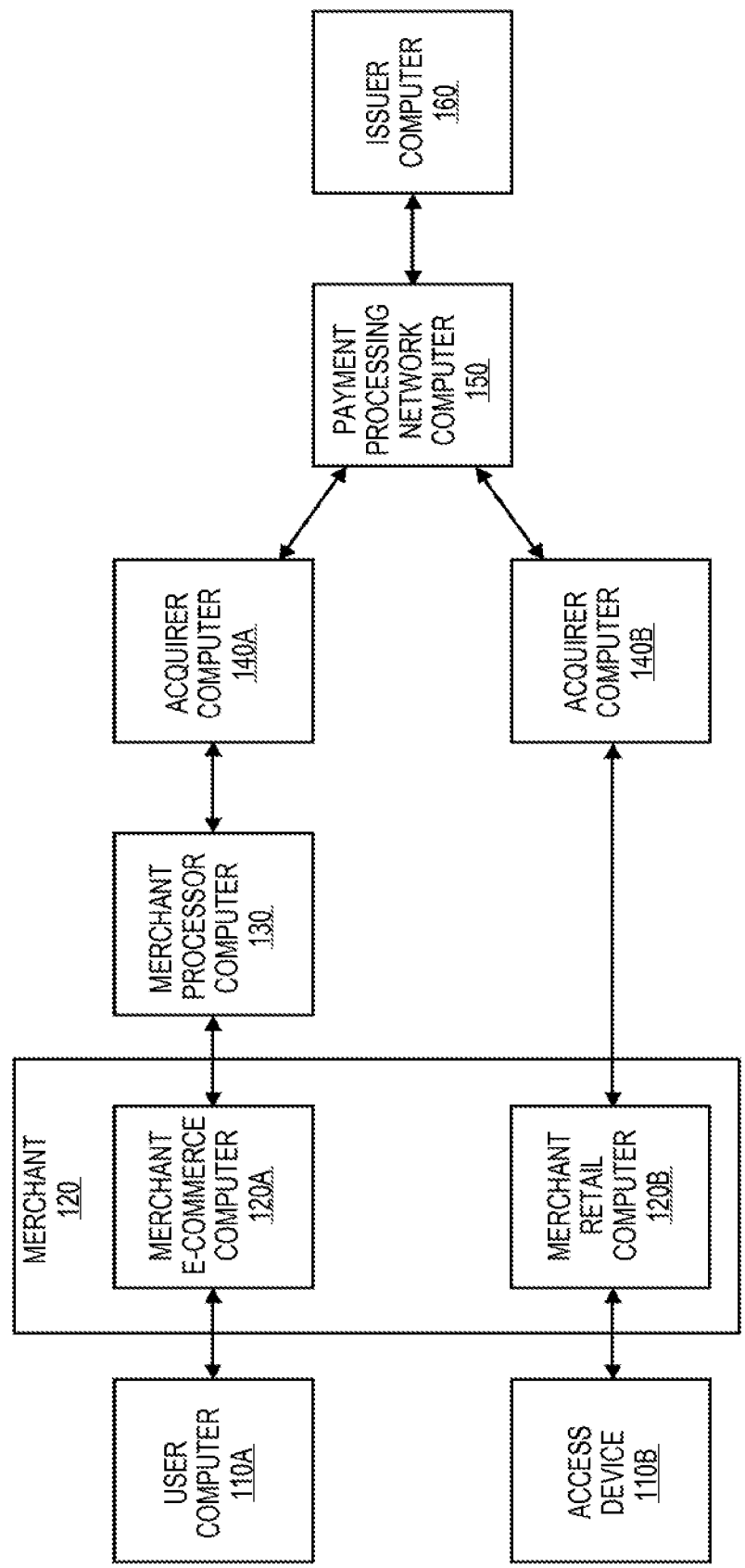
FIG. 1 illustrates an exemplary block diagram of an exemplary payment transaction system with two separate payment channels including retail (i.e., brick and mortar) as well as online (i.e., e-commerce) transaction processing systems, according to an exemplary embodiment of the present invention.

Embodiments of the present invention are directed to methods, systems, and apparatuses for generating and providing universal identifiers to allow various entities (e.g., merchants, acquirers, issuers, payment processors, etc.) to identify consumer activity, regardless of the particular payment methods, systems, and/or devices used by the consumer. In order to accomplish this, embodiments of the invention may generate and provide a universal account identifier before, during, or after a payment transaction conducted by the consumer. This universal account identifier may be used to track and correlate transactions, regardless of the way in which a transaction is conducted. For example, the methods and systems can be used to match e-commerce and physical point-of-sale (POS) transaction data that is associated with a single underlying account so that a merchant can perform data analytics, fraud analytics, and/or other processing on that account.

Most merchants today accept payments for transactions through their Websites as well as at their physical point-of-sale (POS) terminals. However, the two types of transactions may not be processed in the same manner and the transaction data stored by the merchant may not be the same for each type of transaction. For example, retail transactions may be processed using a primary account identifier (e.g., credit card number) that may be associated with an account issued by an account issuer or bank. The primary account identifier may be stored on a portable consumer device (e.g., a credit card, debit card, etc.) and the portable consumer device may be provided to a merchant during a retail transaction. To initiate a payment transaction, the consumer may take his portable consumer device and use it to tap, swipe, or otherwise interact with a merchant access device (e.g., a point-of-sale terminal) operated by the merchant. A transaction authorization request message may be generated by the access device and it may be sent to an issuer for approval. The issuer may then respond to the merchant access device with an authorization response message.

In some e-commerce transactions, a payment token may be used instead of a real account number. This can be done to ensure that the account data is secure and cannot be obtained by unauthorized persons. For example, a payment token may be stored at a merchant Website along with other consumer data (e.g., shipping address, billing address, etc.) and a consumer may use the payment token to pay for continuing purchases on the merchant Website. As compared to in-person or card present types of transactions, payment tokens are often stored by e-commerce merchants, because multiple purchases can be made by consumers at the websites operated by the merchants.

As illustrated above, the tokenized or masked account data may not match the primary account identifier, even if the same portable consumer device and/or consumer account is used for each transaction. Accordingly, a merchant may not be able to match transactions initiated over the separate payment channels because the payment token and the primary account identifier do not match and thus the merchant may not know that the consumer initiated both transactions. This mismatch prevents merchants from matching customers across multiple sales channels or platforms. As such, merchants are not provided with a full picture of a customer's purchasing history, preferences, and whether the customer even uses both purchasing platforms.

For example, a consumer may walk into a merchant and purchase a shirt at their retail location. The consumer may use a credit card comprising a primary account identifier (e.g., "1111222233334444") to purchase the shirt and the merchant may store the primary account identifier along with other transaction information including the type of item purchased, the transaction amount, how many items, the time and date, the merchant location of the transaction, etc. in a merchant database. Furthermore, the consumer (also referred to as a user) may later log onto the merchant's Website and purchase a pair of pants. The consumer may use the same credit card or other payment device associated with the primary account identifier as was used at the merchant's retail store. However, due to security concerns and the manner in which some e-commerce transactions are processed, the merchant may not receive the primary account identifier during an online transaction. Instead, the merchant may receive a payment token (e.g., "4444333322221111") that may be derived from the primary account identifier and is provided by the merchant processor that processes payment transactions on behalf of the merchant. Accordingly, the merchant can only store the payment token along with the transaction information in the merchant database. Therefore, the merchant may have two separate analytics database entries corresponding to the two transactions that are independent and unrelated to each other. As such, even though the consumer bought two items from the merchant using the same credit card, the merchant cannot determine that the shirt and pants were purchased by the same consumer with the same credit card and cannot merge the two transaction database entries into a single consumer entry in order to better understand consumer transaction history. The lack of understanding may further disrupt fraud analysis, system security, and other aspects of the system.

However, in embodiments of the invention, a universal account identifier generator computer (which may be operated by one or more computers) may provide a universal account identifier that may be used to represent the consumer account for various transaction types or channels (e.g., e-commerce, physical point of sale, mobile, etc.). For instance, using the example above, a merchant that sells clothes may submit transaction data generated from retail and online transactions to a universal account identifier generator system that may convert a real primary account identifier (e.g., 1111222233334444) that is used for a retail transaction and/or a payment token (e.g., 4444333322221111) that is used in an e-commerce transaction into the same universal account identifier (e.g., 1A3B2C4D). The universal account identifier generator computer may generate a universal account identifier by converting the real primary account identifier into a universal account identifier that is repeatable and unique to a particular consumer for all transaction completed with the merchant. Furthermore, for e-commerce transaction data, the universal account identifier generation system may convert the tokenized payment token associated with a payment processing service or merchant processor into the corresponding primary account identifier and then convert the primary account identifier into the same universal account identifier that was generated in response to the retail information. Accordingly, a computer can process and/or analyze transaction data associated with the universal account identifier, so that, for example, e-commerce and physical point of sale transaction data associated with a single account and a single consumer can be analyzed together.

Embodiments of the present invention provide a number of advantages. For example, the universal account identifier generator computer providing a single universal identifier for transactions processed across e-commerce, retail, and any other payment channels provides a merchant with a more complete record of consumer behavior across multiple payment channels. Better fraud detection and marketing can be performed with complete account transaction records. For example, if an account is associated with clearly identifiable fraudulent behavior in e-commerce transactions, the corresponding use of the account at a physical point of sale could be identified as fraudulent, even though the fraudulent use of the account solely at the physical point of sale would not be otherwise identifiable. As an illustration, a payment token that is used at a merchant Website may be associated with multiple chargebacks indicating fraudulent behavior. However, the use of the corresponding real account number at a physical point of sale may not result in an excessive number of chargebacks. By using a universal account identifier to tie the transactions conducted at physical point of sales and e-commerce transactions together, it is possible to identify the real account identifier as being associated with fraudulent activity. If the real account identifier is identified as being associated with fraudulent activity, it can be put on a blacklist to prevent future fraud. Alternatively or additionally, the e-commerce and physical point of sale data can be aggregated as being associated with a fraudulent account and this data can be used to update fraud risk models to prevent the authorization of other similar types of transactions conducted with similar behavioral patterns.

In another example, by tying physical point of sale and e-commerce transactions associated with the same underlying account together, it is possible to perform better marketing towards the holder of the underlying account. For example, an underlying account may be used to conduct many transactions for shoes at a merchant's physical point of sale, but may not be used to purchase shoes on the merchant's Website. The use of the universal account identifier allows the merchant to discover that the consumer associated with the underlying account likes to purchase shoes, and relevant marketing materials may be presented to the consumer. For example, coupons providing discounts for shoe purchases on the merchant's Website may be mailed or e-mailed to the consumer.

Prior to discussing the specific embodiments of the invention, a further description of some terms can be provided for a better understanding of embodiments of the invention.

According to some embodiments, "transaction data" can include any data associated with one or more transactions. In some embodiments, the transaction data may merely include an account identifier or payment token. Alternatively, in other embodiments, the transaction data may include any information generated, stored, or associated with a merchant, consumer, account, or any other related information to a transaction. For example, transaction data may include data in an authorization request message that is generated in response to a payment transaction being initiated by a consumer with a merchant. Alternatively, transaction data may include information associated with one or more transactions that have been previously processed and the transaction information has been stored on a merchant database or other merchant computer. The transaction data may include an account identifier associated with the payment instrument used to initiate the transaction, consumer personal information, products or services purchased, or any other information that may be relevant or suitable for transaction processing. Additionally, the transaction information may include a payment token or other tokenized or masked account identifier substitute that may be used to complete a transaction and protect the underlying account information of the consumer.

Additionally, in some embodiments, there may be different types of transaction data including e-commerce transaction data, retail transaction data, mobile transaction data, etc. For example, each type of transaction data may be dependent on the type of transaction or the channel in which the transaction is initiated (e.g., an e-commerce transaction initiated over the internet may generate e-commerce transaction data). Each type of transaction data may comprise different types of data or may comprise the same type of data. For example, a retail transaction may generate retail transaction data when a consumer swipes a credit card at a point-of-sale terminal of a merchant. The retail transaction data may comprise Track 1 and/or Track 2 payment data included on the magnetic stripe or chip of the consumer's credit card (or other payment device). Accordingly, the retail transaction data may comprise the Track 1 and/or Track 2 data as well as additional data associated with the consumer, merchant, account associated with the payment device, or any other information.

Furthermore, in some embodiments, multiple types and instances of transaction data may be received and processed. For example, "first transaction data" and "second transaction data" may include separate transaction data that is generated by transactions that are separated by time, merchant, merchant location, consumer location, transaction type, or any other variable that would cause transaction data associated with a single consumer account to be separated into two different messages or pieces of data. For example, first transaction data may be related to a first transaction originated at a first time and second transaction data may relate to a second transaction initiated at a second time. In some embodiments, the first transaction data and the second transaction data may be received by components within the transaction system at the same time (e.g., in a single communication message) or may be received at two different times (e.g., in separate messages). Accordingly, transaction data may comprise any number of transaction data (e.g., first transaction data, second transaction data, third transaction data, etc.) associated with any number of transactions. First transaction data and second transaction data may be related to transactions that are completed by the same consumer or another person using the consumer's same underlying primary account identifier. For example, a consumer may initiate a first transaction that generates first transaction data and then a friend or agent of the consumer may initiate a second transaction on behalf of the consumer using their credit card or other payment device that generates second transaction data.

A "payment token" may include any series or combination of characters, numerals, or other identifiers that represent an account being used in a payment transaction and may be substituted for a primary account identifier during a transaction. For example, a payment token may include a masked, tokenized, or substitute account identifier that may be used instead of the consumer's primary account identifier, in order to protect the security of the consumer's account information. For instance, during a payment transaction that is initiated over the internet, a merchant processor may be utilized to process the Internet or e-commerce transactions. In order to protect the consumer's primary account identifier, the merchant processor may interface with the merchant's online store and may embed a hosted order page (HOP) or silent order page (SOP) in order to process the transactions on the merchant's behalf. In order to protect the consumer's account identifier, the HOP/SOP page may tokenize or mask the account information entered by a consumer during a transaction so that if the electronic communication over the internet is intercepted by a malicious third party, no sensitive account information may be stolen that could be used to initiate unauthorized transactions. The tokenized account information or payment token may be useless without the malicious third party knowing the tokenization or masking algorithm. Accordingly, the payment token may be derived from the primary account identifier.

A "primary account identifier" may include any series or combination of digits, alphanumeric characters, numbers, or graphics that may identify or be associated with a consumer's issued account at an account issuer or bank. Typically, a primary account identifier may include both an account identifier portion as well as a bank or issuer identifier (BIN) so that a payment processing network may determine which issuer is associated with the primary account identifier. The primary account identifier may be a real or tangible account identifier and thus may be tied to an actual issuer account and may be used by the issuer to identify the account and may not merely include another substitute account identifier. Typically, in credit or debit card transactions, a primary account identifier may be stored in Track 1 data and may be transferred to a merchant's access device or point-of-sale (POS) device when a card or other consumer device is swiped at the merchant device. As explained previously, in some embodiments, the primary account identifier may be tokenized, masked, or otherwise substituted during a transaction to generate a payment token that may be registered and substituted during a payment transaction.

A "universal account identifier" may include any series or combination of alphanumeric characters, digits, numbers, or graphics that may identify transactions initiated by a particular consumer's account across any number of payment channels. For example, a universal account identifier may include a unique and reproducible account identifier for any transaction completed by a consumer across e-commerce, retail, and mobile transaction channels. A universal account identifier may be generated by a universal account identifier generation system and may be delivered either before, during, or after a transaction. The universal account identifier may be a substitute for a payment token and/or a primary account identifier associated with the transaction.

The universal account identifier may be generated in any suitable manner. For example, the universal account identifier may be generated by applying a conversion algorithm to a primary account identifier. The conversion algorithm may generate a universal account identifier that may be cryptographically secure (e.g., a hashable one-way security mechanism) and it may be referentially transparent, meaning that every time a request for a universal account identifier is received including a particular primary account identifier or payment token, the same universal account identifier may be generated and returned to a requestor, which may include any entity in the transaction system (e.g., merchant, merchant processor, acquirer, payment processing network, etc.). Furthermore, universal account identifiers may be considered different than pure tokenization because the universal account identifier is repeatedly generated for any number of transactions associated with the consumer device. In typical tokenization systems, a new one-time use token may be generated for each transaction and although some systems may re-use tokens, the re-used tokens will most likely not be associated with the same consumer again. Furthermore, the conversion algorithm may be specialized or customized for each merchant such that the different conversion algorithms may be not be shared between merchants and the universal account identifiers are unique between merchants. Accordingly, merchants may be able to configure or otherwise impact the format of the universal account identifiers used to match transactions of their consumers across multiple payment transactions. Such formatting options may include the type of characters (e.g., alphanumeric, binary, etc.), length, etc. of the universal account identifiers.

A "payment transaction" may include any interaction between a buyer and a seller for a good or service. For example, a payment transaction may include a consumer initiating a transaction at a merchant website through a user computer or may include a consumer completing a purchase at a merchant's physical brick and mortar storefront.

Operations that occur during a payment transaction may include any operations, steps, methods, or other activity that may occur after the initiation of a payment transaction and before a merchant receives confirmation or authorization to complete a transaction with a consumer. For example, during typical transaction processing, a consumer may initiate a transaction by swiping their payment device at a merchant access device which may generate an authorization request message that may be transferred through a payment transaction processing system in order for a payment to be processed, as will be described in further detail below. Any actions that occur after a transaction has been initiated and an authorization request message has been generated but before a merchant receives an authorization response message from an issuer associated with the consumer, may be considered as being during a payment transaction.

Operations that occur after a payment transaction may include any operations, steps, methods, or other activity that may occur after the completion of a payment transaction and thus after the merchant receives authorization of a payment transaction. As explained above, in some embodiments, an issuer associated with a consumer may generate and transfer an authorization response message through a payment transaction system. The authorization response message may include an indication as to whether a transaction is authorized.

A "retail payment transaction" may include a payment transaction that is initiated at a merchant or through a merchant access device (e.g., point-of-sale device). For example, a retail payment transaction may include transactions that are initiated by a consumer using a portable consumer device (e.g., credit or debit card) while shopping at a merchant's brick and mortar storefront or other physical location.

An "e-commerce payment transaction" may include a payment transaction that is initiated by a consumer using a user computer, mobile communication device, or other electronic device over the internet. For example, a consumer may visit a merchant's e-commerce or internet website, may select a number of items or services they wish to purchase, and may check out or otherwise initiate a payment transaction over the internet in order to purchase the items or service.

A "mobile payment transaction" may include a payment transaction that is initiated by a consumer using a mobile device. For example, a consumer may initiate a transaction using a mobile communication device that is configured to complete transactions using accounts stored on digital wallets and communicates with a merchant's access device via near-filed communication (NFC) or other communication standard.

A "de-tokenization request message" may include any message that requests de-tokenization of a payment token from a processor associated with the payment token. For example, a de-tokenization request message may be sent by a universal account identifier system to de-tokenize a payment token when the universal account identifier system does not have access to the tokenization algorithm or tokenization scheme of the processor or otherwise does not recognize the consumer account, payment token, consumer associated with the payment token, or any other relevant information in the payment transaction data in order to determine a primary account identifier associated with a consumer. In such cases, the universal account identifier system may request the payment token be de-tokenized such that the underlying primary account identifier may be determined and a universal account identifier that is associated with the payment token as well as any transactions initiated using the primary account identifier may be matched.

A "de-tokenization response message" may include any message that is sent in response to the de-tokenization request message. For example, the de-tokenization response message may be sent from a merchant processor associated with a payment token and may include the primary account identifier associated with the payment token that was included in the de-tokenization request message. Additionally, if a merchant processor does not recognize or cannot otherwise determine the consumer account or primary account identifier associated with the payment token, the de-tokenization response message may include an error message, unknown payment token message, or other information to inform a system that the payment token cannot be de-tokenized.

A "universal account identifier request message" may include any message sent to a universal account identifier generator computer from a requestor that includes a request for a universal account identifier. Any entity in the transaction ecosystem may request a universal account identifier request message from a universal account identifier generator computer. For example, the universal account identifier request message may be sent by a merchant or a merchant processor. The universal account identifier request message may include a primary account identifier or a payment token associated with a transaction initiated by a consumer across any number of payment channels. Furthermore, the universal account identifier request message may also include any other transaction information including details related to the underlying transaction associated with the payment token or primary account identifier. Furthermore, the universal account identifier generator computer may also be capable of providing value add transaction services including providing offers, promotions, fraud detection, etc. and any information that may be relevant to such operations may be included in the universal account identifier request message.

Additionally, in some embodiments, the universal account identifier request message may include personal information including consumer name, telephone number, or other identifier that may allow a universal account identifier generator computer to determine the consumer associated with a request and return a universal account identifier that may be used to identify a consumer or a consumer account. For example, it may be possible for the system to receive any other unique information for a consumer in a universal account identifier request message and generate a universal account identifier by either using the underlying unique information or by determining a stored universal account identifier associated with the unique information. For instance, in some embodiments, it may be possible to receive a name, social security number, or a combination thereof, and a conversion algorithm may be applied to the unique information in order to determine a universal account identifier associated with the consumer. Additionally, such techniques could be applied to physical track data on a consumer device or any other transaction data that may be associated with an underlying transaction that uniquely identifies the user or consumer.

A "universal account identifier response message" may include any message from a universal account identifier generator computer that is sent in response to a universal account identifier. For example, a universal account identifier response message may include a universal account identifier that is generated or determined in response to a universal account identifier request message that included a particular primary account identifier, primary account number (PAN), payment token, or other unique consumer information that allows a universal account identifier generation computer to determine and/or generate a universal account identifier associated with a universal account identifier request message. Universal account identifier request messages and universal account identifier response messages may be identified by the requester of the universal account identifier request message. For example, if a merchant is requesting a universal account identifier request message, the universal account identifier request message may be referred to as a merchant universal account identifier request message. Similarly, the universal account identifier response message that is sent in response to the merchant universal account identifier request message may be referred to as a merchant universal account identifier response message. Thus, a universal account identifier request message from a merchant processor and the subsequent response message may be referred to as a merchant processor universal account identifier request message and merchant processor universal account identifier response message.

An "authorization request message" may be an electronic message that is sent to a payment processing network and/or an issuer of a payment account to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to identification information including, by way of example only: a service code, a CVV (card verification value), a dCVV (dynamic card verification value), an expiration date, etc. An authorization request message may also comprise any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant may call the toll-free authorization phone number. The authorization response message may also include an authorization code, which may be a code that an account issuing bank returns in response to an authorization request message in an electronic message (either directly or through the payment processing network) to the merchant's access device (e.g., POS equipment) that indicates approval of the transaction. The code may serve as proof of authorization. As noted above, in some embodiments, a payment processing network may generate or forward the authorization response message to the merchant.

1. EXEMPLARY SYSTEMS

FIG. 1 illustrates an exemplary block diagram of an exemplary payment transaction system with two separate payment channels including retail (i.e., brick and mortar) as well as online (i.e., e-commerce) transaction processing systems, according to an exemplary embodiment of the present invention. According to embodiments of the present invention, a transaction processing system may include multiple payment channels, each with a unique transaction flow. For example, the transaction processing system of FIG. 1 shows a transaction processing system capable of processing both retail and e-commerce payment transactions.

The retail transaction processing channel may comprise a typical transaction system including an access device 110B, a merchant 120 including a merchant retail computer 120B, an acquirer computer 140B, a payment processing network computer 150, and an issuer computer 160.

As used herein, an "issuer" may typically refer to a business entity (e.g., a bank or other financial institution) that maintains financial accounts for the user and often issues a payment device such as a credit or debit card to the user. As used herein, a "merchant" may typically refer to an entity that engages in transactions and can sell goods or services to the user or consumer. As used herein, an "acquirer" may typically refer to a business entity (e.g., a commercial bank or financial institution) that has a business relationship with a particular merchant 120 or similar entity. Some entities can perform both issuer and acquirer functions.

An access device 110B may include a merchant point-of-sale (POS) device, a consumer's mobile communication device, or any other device that is capable of communicating payment information to a merchant retail computer 120B.

A merchant retail computer 120B may be in electrical communication with the access device 110B and may include any server computer programmed to process and manage retail transactions for a merchant 120. As used herein, a "server computer" is typically a powerful computer or cluster of computers. For example, the server computer can be a large mainframe, a minicomputer cluster, or a group of servers functioning as a unit. In one example, the server computer may be a database server coupled to a Web server.

An acquirer computer 140B may be configured to electrically communicate with the merchant retail computer 120B and a payment processing network computer 150.

A payment processing network may be disposed between the acquirer computer 140B and the issuer computer 160 in the system. Furthermore, the merchant retail computer 120B, the acquirer computer 140B, the payment processing network, and the issuer computer 160 may all be in operative communication with each other (i.e. although not depicted in FIG. 1, one or more communication channels may exist between each of the entities, whether or not these channels are used in conducting a financial transaction).

The payment processing network may include data processing subsystems, networks, and operations used to support and deliver authorization services, exception file services, and clearing and settlement services. For example, the payment processing network may comprise a server computer and databases of information. An exemplary payment processing network may include, for example, VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

A typical credit card transaction flow using a payment device at an access device 110B (e.g., POS location) can be described as follows. (Note that embodiments of the invention are not limited to credit card transactions, but may also include other types of payment transactions including pre-paid and debit transactions). A user presents his or her payment device to an access device 110B to pay for an item or service. The payment device and the access device 110B interact such that information from the payment device (e.g., PAN, verification value(s), expiration date, etc.) is received by the access device 110B (e.g., via contact or contactless interface). The merchant retail computer 120B may then receive this information from the access device 110B via the external communication interface. The merchant retail computer 120B may then generate an authorization request message that includes the information received from the access device 110B (i.e., information corresponding to the payment device) along with additional transaction information (e.g., a transaction amount, merchant specific information, etc.) and electronically transmit this information to an acquirer computer 140B. The acquirer typically represents, and vouches for, the merchant in financial transactions (e.g., credit card transactions). The acquirer computer 140B may then receive, process, and forward the authorization request message to a payment processing network for authorization.

In general, prior to the occurrence of a credit-card transaction, the payment processing network has an established protocol with each issuer on how the issuer's transactions are to be authorized. In some cases, such as when the transaction amount is below a threshold value, the payment processing network may be configured to authorize the transaction based on information that it has about the user's account without generating and transmitting an authorization request message to the issuer computer 160. In other cases, such as when the transaction amount is above a threshold value, the payment processing network may receive the authorization request message via its external communication interface, determine the issuer associated with the payment device, and forward the authorization request message for the transaction to the issuer computer 160 for verification and authorization. As part of the authorization process, the payment processing network or the issuer computer 160 may analyze a verification value or other datum provided by the payment device. The verification value may be stored at the issuer or the payment processing network (e.g., in one or more of databases). Once the transaction is authorized, the issuer computer 160 may generate an authorization response message (that may include an authorization code indicating the transaction is approved or declined) and transmit this electronic message via its external communication interface to payment processing network. The payment processing network may then forward the authorization response message via a communication channel to the acquirer computer 140B, which in turn may then transmit the electronic message to comprising the authorization indication to the merchant retail computer 120B.

In the credit card industry, for example, the authorization indication typically takes the form of an authorization code, which is five or six alphanumeric characters, by convention. It serves as proof to the merchant 120 and the consumer that the issuing bank or payment processing network has authorized the transaction, and may be used by the merchant 120 or the consumer as proof of authorization if the issuing bank later disputes the transaction, such as during settlement.

When a user wishes to make an online purchase with a merchant 120 over the Internet (i.e. e-commerce), a similar method as described above may be performed except that the user may use his computer apparatus or mobile device to provide information associated with a payment device (e.g., account number, user's name, expiration date, verification value, etc.) into respective fields on the merchant's checkout page (e.g., functioning as user computer 110A). The user computer 110A may then provide this information to the merchant e-commerce computer 120A for processing.

The transaction processing system of FIG. 1 also includes an e-commerce transaction processing channel. The e-commerce transaction processing system (i.e., e-commerce transaction channel) may include a user computer 110A, a merchant 120 including a merchant e-commerce computer 120A, a merchant processor computer 130, an acquirer computer 140A, a payment processing network computer 150, and an issuer. As is shown in FIG. 1, many of the entities may be the same for both e-commerce and retail transaction channels. For example, the payment processing network, issuer, and in some embodiments, the acquirer computer (not shown) may be the same for both transaction channels.

A user computer 110A may include any device operated by a consumer that may communicate with a merchant e-commerce computer 120A. For example, a user computer 110A may include a user's smartphone, tablet, laptop, kiosk operated by a consumer, or any other electronic device capable of communicating with a merchant e-commerce computer 120A.

A merchant e-commerce computer 120A may comprise one or more server computers that are configured to communicate with a user computer 110A and/or a merchant processor computer 130. The merchant e-commerce computer 120A may be coupled to an e-commerce merchant database that may comprise merchant goods and services that may be listed for sale by the merchant 120 and may be purchased by a consumer over the internet. Accordingly, the merchant e-commerce computer 120A may be capable of delivering web content to a user computer 110A, receiving information, commands, and/or requests from the consumer, and may process a transaction or collaborate with a merchant processor computer 130 to process a transaction requested by a consumer.

A merchant processor computer 130 may include any server computer that is configured to communicate with a merchant e-commerce computer 120A and an acquirer computer 140A. A merchant processor computer 130 may receive e-commerce transaction data from the merchant e-commerce computer 120A. The e-commerce transaction data may comprise transaction data including transaction details (e.g., transaction amount, time, date, merchant identifier, etc.) as well as a payment token associated with a consumer's primary account identifier. The consumer may enter or provide their primary account identifier during a checkout or other payment initialization phase with the merchant's website.

For example, in some embodiments, the consumer may provide their primary account identifier through a hosted order page (HOP) or stop order page (SOP) that may be delivered by the merchant processor computer 130 to the user computer 110A as part of the transaction initiation process. Accordingly, the merchant e-commerce computer 120A may be configured such that the merchant 120 does not have to store or even have access to a consumer's payment information during a transaction. Instead, the merchant e-commerce computer 120A may incorporate the merchant processor computer 130 to process the online payment transaction. The merchant processor computer 130 may deliver a HOP or SOP as part of a transaction payment initialization or payment checkout of a merchant's e-commerce website. The HOP/SOP may allow a consumer to enter their payment details or otherwise sign into their pre-configured account. The information may be passed to the merchant processor computer 130 which may comprise a database of consumer information.

The database of consumer information may store a consumer's primary account identifier during a registration step for the service or at checkout of the merchant's website. After registration, the HOP/SOP may not pass a primary account identifier over the internet or other communication network used to complete the transaction. Instead, the HOP/SOP may generate a payment token during transaction initialization or submission at checkout. The payment token may be derived from the primary account identifier that a consumer may enter into the checkout page. The payment token may be considered a tokenized account identifier but the tokenization may be accomplished by applying any suitable tokenization algorithm, scheme, or process, as one of ordinary skill would recognize. Additional information regarding the HOP/SOP pages, the payment token, and the interaction between the merchant e-commerce computer 120A and the merchant processor computer 130 may be found in U.S. patent application Ser. No. 13/559,250, filed Jul. 26, 2012, by McCullagh et al., the disclosure of which is hereby incorporated by reference in its entirety for all purposes.

The merchant processor computer 130 may receive the payment token and may determine a primary account identifier associated with the payment token. The merchant processor computer 130 may then process the transaction by forwarding the primary account identifier associated with the payment token to an appropriate payment processor network computer 150 or acquirer computer 140A.

Once at the acquirer computer 140A, the transaction processing may continue as a typical payment transaction may be processed, as described above in reference to the retail payment transaction processing. Although the payment token processing is not a typical ISO message as described above in reference to the retail payment transaction, the e-commerce payment transaction request may also be referred to as an authorization request message because a request for an authorization of a payment transaction is being generated, processed through the request being sent to an acquirer computer 140A, payment processing network computer 150, and an issuer computer 160, and an authorization response message including whether the transaction is authorized is returned to the merchant 120 and consumer. Accordingly, both e-commerce and retail payment transactions may include authorization request message and authorization response message processing.

However, the authorization response message may have the primary account identifier substituted with the payment token when returned to the merchant processor computer 130 so that the merchant e-commerce computer 120A does not gain access to the primary account identifier and the system's security is maintained. Accordingly, the merchant 120 may only receive a payment token and may not receive the primary account identifier during an e-commerce transaction with a consumer. However, such a payment token is not generated during the retail transaction processing. Accordingly, transactions completed using the same consumers primary account identifier may result in two different values at a merchant 120.

Accordingly, the transaction system of FIG. 1 may incorporate a universal account identifier generator computer 131 (as described in reference to FIG. 2) in order to match or associate consumers transactions across both retail and e-commerce payment channels. However, the universal account identifier generator computer 131 may be incorporated into the payment transactions in a number of different ways including before, during, or after authorization of a payment transaction. Accordingly, a universal account identifier generator computer 131 may be contacted and a universal account identifier may be requested during or after a payment transaction. Additionally, the universal account identifier generator computer may also be referred to as a module or a service and in some embodiments, the functionality may be provided by the merchant processor computer 130 or another entity in the transaction eco-system.

A. Universal Account Identifier Generation During Payment Transactions

Figure 2:
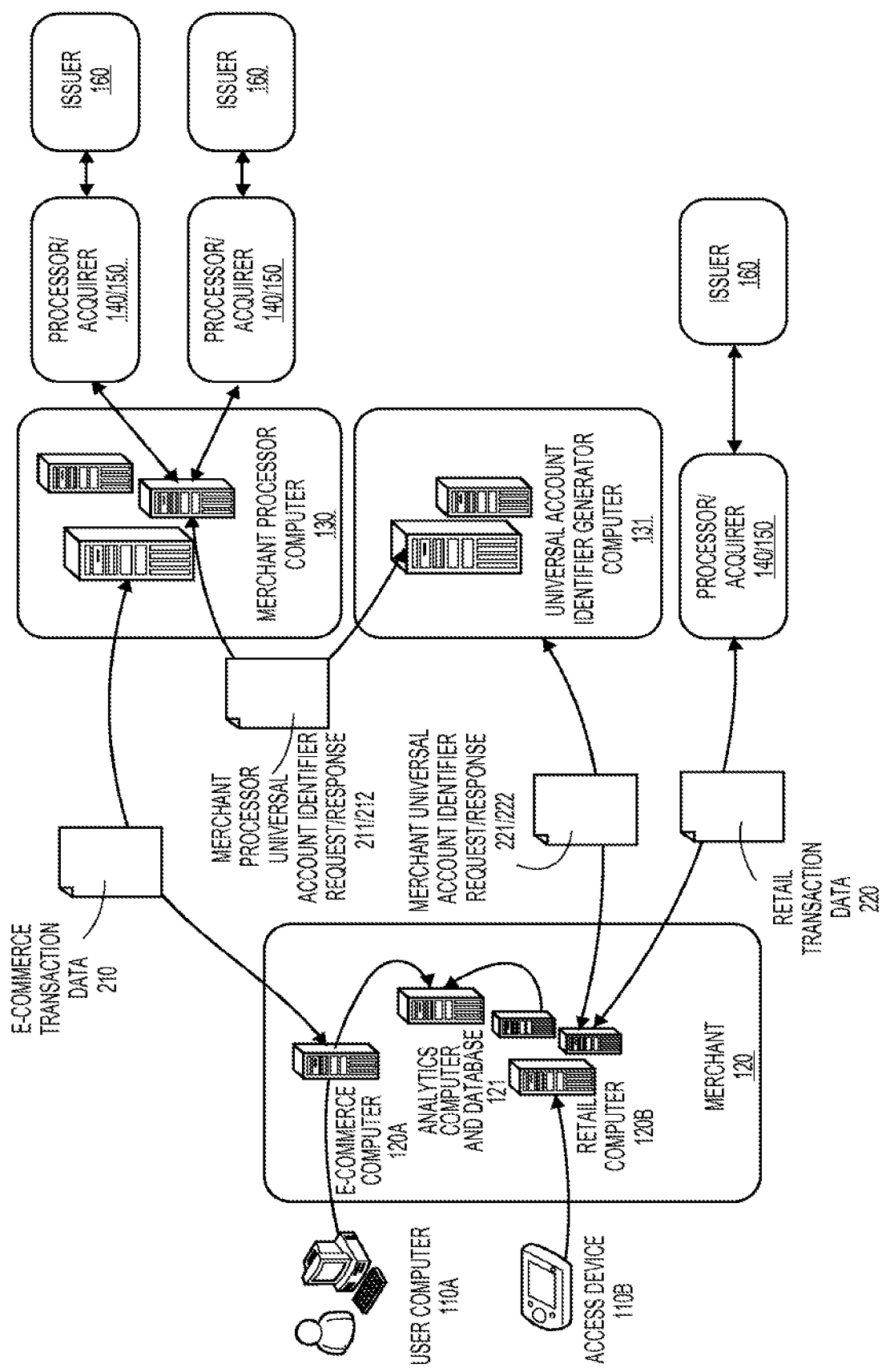
FIG. 2 illustrates an exemplary block diagram of a universal account identifier generation system that may be incorporated into a transaction flow during transaction processing, according to one embodiment of the present invention.

Embodiments of the present invention may be utilized to match payment information both during and after a payment transaction. FIG. 2 shows another view of the transaction system of FIG. 1 including both e-commerce and retail payment transaction channels incorporating a universal account identifier generator computer 131 that is contacted during a payment transaction through either channel.

As shown in FIG. 2, the transaction system may comprise all of the same entities as those described in reference to FIG. 1 above. Additionally, a universal account identifier generator computer 131 may be incorporated into the transaction system.

A universal account identifier generator computer 131 may include any server computer that is configured to receive requests for universal account identifiers from merchants 120 or merchant processor computers 130 and provide universal account identifiers in response. For example, the universal account identifier generator computer 131 may comprise modules or software to receive a universal account identifier request message including transaction data, determine if the transaction data comprises a payment token or a primary account identifier, and generate a universal account identifier associated with the transaction data. As shown in FIG. 2, the universal account identifier request message 211,221 may be sent from a merchant e-commerce computer 120A or a merchant retail computer 120B during a transaction. The process for generating a universal account identifier each type of transaction (e-commerce or retail) is described in detail below and may be seen in the flow chart of FIG. 4.

Additionally, in some embodiments, the universal account identifier generator computer 131 may comprise a processor, and a computer-readable medium coupled to the processor. The computer readable medium may comprise code executable by the processor for causing the processor to perform a method. The method may comprise receiving first transaction data comprising a payment token or second transaction data comprising a primary account identifier, where the payment token may be derived from the primary account identifier and providing a universal account identifier after receiving the payment token or the account identifier, wherein the universal account identifier may be a substitute for the payment token and the primary account identifier.

Furthermore, the universal account identifier generator computer 131 may further comprise a database of universal account identifiers and associated information. So, for example, the universal account identifier generator computer 131 may be capable of associating a universal account identifier with a primary account identifier or a payment token and may associate the universal account identifier with a customer loyalty account number and may provide a number of additional functionality for providing additional value added services in addition to generating and providing a universal account identifier.

In some embodiments, the merchant processor computer 130 may comprise a processor, and a computer-readable medium coupled to the processor. The computer-readable medium may comprise code executable by the processor for causing the processor to perform a method. The method may comprise receiving e-commerce transaction data including a payment token from a merchant computer, determining a primary account identifier associated with the payment token, determining a universal account identifier associated with the primary account identifier, and sending the universal account identifier to the merchant computer. In some embodiments, the step of determining a universal account identifier associated with the primary account identifier may include sending a universal account identifier request message comprising the primary account identifier to a universal account identifier generator computer, wherein the universal account identifier generator computer generates a universal account identifier by applying a conversion algorithm to the primary account identifier and receiving a universal account identifier response message comprising the universal account identifier. Alternatively, the step of determining a universal account identifier associated with the primary account identifier may include searching a database for a universal account identifier associated with a received payment token or primary account identifier. Any other suitable methods for determining a universal account identifier may be used as well. The merchant computer may store the universal account identifier in a database comprising e-commerce transaction data and retail transaction data.

i. Providing a Universal Account Identifier During an E-Commerce Transaction

For e-commerce transactions, a consumer may initiate a transaction using a user computer 110A and may submit a transaction request to a merchant e-commerce computer 120A. The merchant e-commerce computer 120A may host a merchant Website, and may generate and send e-commerce transaction data 210 to a merchant processor computer 130. As explained previously, e-commerce transaction data 210 may comprise a payment token including a tokenized version of the primary account identifier entered by the consumer.

Accordingly, the merchant processor computer 130 may receive the e-commerce transaction data 210 including a payment token and may determine a primary account identifier associated with the payment token. The merchant processor computer 130 may thereafter generate and send a merchant processor universal account identifier request message 211 to the universal account identifier generator computer 131. The universal account identifier generator computer 131 may then receive the merchant processor universal account identifier request message 211 comprising the transaction data (step 401).

In some embodiments, the merchant processor universal account identifier request message 211 may comprise the primary account identifier determined by the merchant processor computer 130. However, the merchant processor universal account identifier request message 211 may alternatively include the payment token. If so, the universal account identifier generator computer 131 may determine the primary account identifier associated with the payment token by sending a de-tokenization request message 331 to the merchant processor and receiving a de-tokenization response message 332 from the merchant processor (steps 403A-405A). Alternatively, where the universal account identifier generator computer 131 is incorporated into the merchant processor or otherwise has access to the consumer database stored at the merchant processor, the universal account identifier generator computer 131 may determine the primary account identifier by searching the relevant consumer database (not shown).

Otherwise, the merchant processor universal account identifier request message 211 may comprise transaction data including a primary account identifier and the universal account identifier generator computer 131 generates the universal account identifier for the primary account identifier received in the merchant processor universal account identifier request message 211 (step 405B). Thereafter, the universal account identifier generator computer 131 may generate and send a universal account identifier response message 212 including the universal account identifier to the merchant processor computer 130 (step 406).

The universal account identifier may be generated by applying a conversion algorithm to the received primary account identifier to convert the primary account identifier to a universal account identifier that is unique, reproducible, and repeatable. For example, the conversion algorithm may produce a non-sequential alphanumeric sequence for the universal account identifier. In some embodiments, the conversion algorithm may utilize, for example, a one-way cryptographically secure hash, meaning that the universal account identifier is not readily translatable back to the original account number. Additionally, the universal account identifier may not be referentially transparent meaning that the same universal account identifier may be generated for the same primary account identifier. The conversion algorithm may be implemented in any suitable manner as would be recognized by one or ordinary skill.

During the generation and subsequent receiving of the universal account identifier or after receiving the universal account identifier, the merchant processor computer 130 may submit the transaction data for processing by generating an authorization request message comprising the primary account identifier and submitting the authorization request message to an acquirer 140 and subsequent payment processing network 150 associated with the merchant processor and the consumer's payment account. The payment processing network 150 and issuer 160 may subsequently return an authorization response message and the merchant processor computer 130 may substitute the primary account identifier in the authorization response message with the universal account identifier. Accordingly, the merchant e-commerce computer 120A may receive the universal account identifier in the authorization response message and may store the universal account identifier in a merchant analytics computer and/or database 121. As will be explained in further detail below, the merchant 120 may also receive a universal account identifier during the processing of the retail transaction and thus, the merchant 120 may receive the same universal account identifier for both retail and e-commerce transactions completed with a consumer's primary account identifier.

Accordingly, by incorporating the universal account identifier generation and retrieval into the transaction flow during transaction processing, the merchant processor and the merchant 120 may identify a customer immediately during the authorization and the merchant processor may react appropriately. For example, by providing discounts, offers, fraud analysis, or any other actions that are aided by identifying a consumer's behavior across multiple payment channels. Accordingly, embodiments of the present invention provide a number of advantages.

ii. Providing a Universal Account Identifier During a Retail Transaction

Retail transactions originating from a brick and mortar or physical location may be processed directly from the retail location by forwarding the primary account identifier information received during the transaction at the merchant retail computer 120B to the universal account identifier generator computer 131 before or in parallel with sending the transaction data or an authorization request message to an acquirer for transaction processing.

Accordingly, when a consumer swipes their portable consumer device (e.g., a credit or debit card) at the access device 110B, the merchant retail computer 120B may send a merchant universal account identifier request message 221 including the primary account identifier that is provided by the portable consumer device and received at the access device 110B. Thereafter, the merchant retail transaction computer 120B may conduct the authorization request and response message processing, as usual. However, the merchant retail computer 120B may associate the transaction data with the universal account identifier and store the transaction data with the received universal account identifier in the analytics computer and database 121 for future analytical analysis of consumer behavior. Accordingly, as with the e-commerce transactions, the merchant 120 may be able to determine a full transaction history for the consumer before processing the transaction and thus may be able to better determine fraudulent activity, provide offers and rewards associated with value added services, and otherwise provide a better consumer experience.

Additionally, although not shown in FIG. 2, a transaction system may comprise additional transaction payment channels including, for example, a mobile channel, that also could do a real-time request to the universal account identifier generator computer 131 and may use the received data to store the transaction data with the universal account identifier to obtain a full transaction history of the user.

B. Universal Account Identifier Generation after Payment Transactions

Most merchant payment systems are fairly closed and not subject to changes in transaction processing. Accordingly, some embodiments of the present invention provide universal account identifiers for requests received after payment transaction have been completed. Accordingly, embodiments of the present invention may also provide universal account identifiers after authorization of e-commerce and retail payment transactions.

Figure 3:
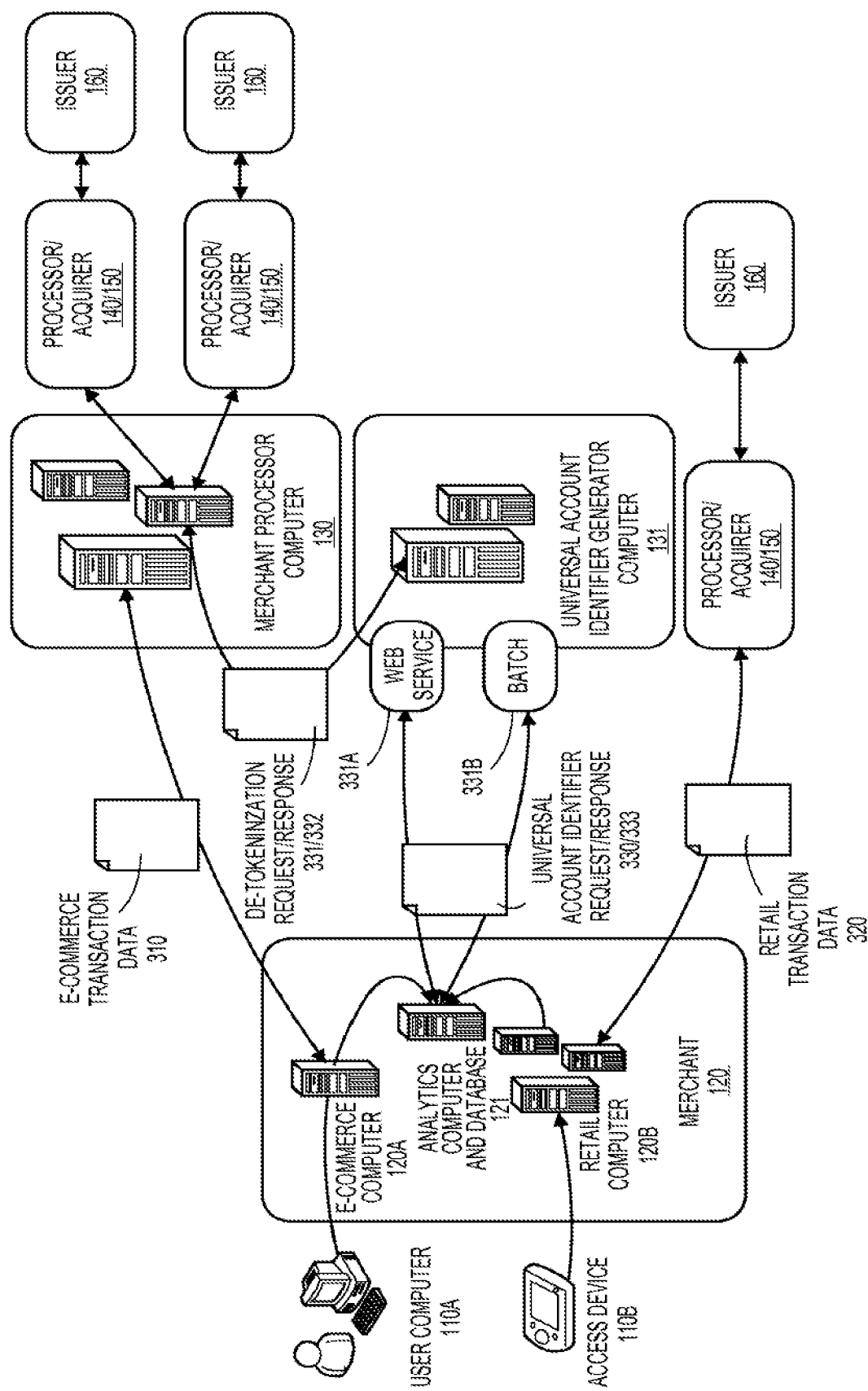
FIG. 3 illustrates an exemplary block diagram of a universal account identifier generation system that may be used to match e-commerce and retail transactions after transaction processing, according to another embodiment of the present invention.

FIG. 3 illustrates an exemplary block diagram of a universal account identifier generation system that may be used to match e-commerce and retail transactions after transaction processing, according to another embodiment of the present invention.

Figure 4:
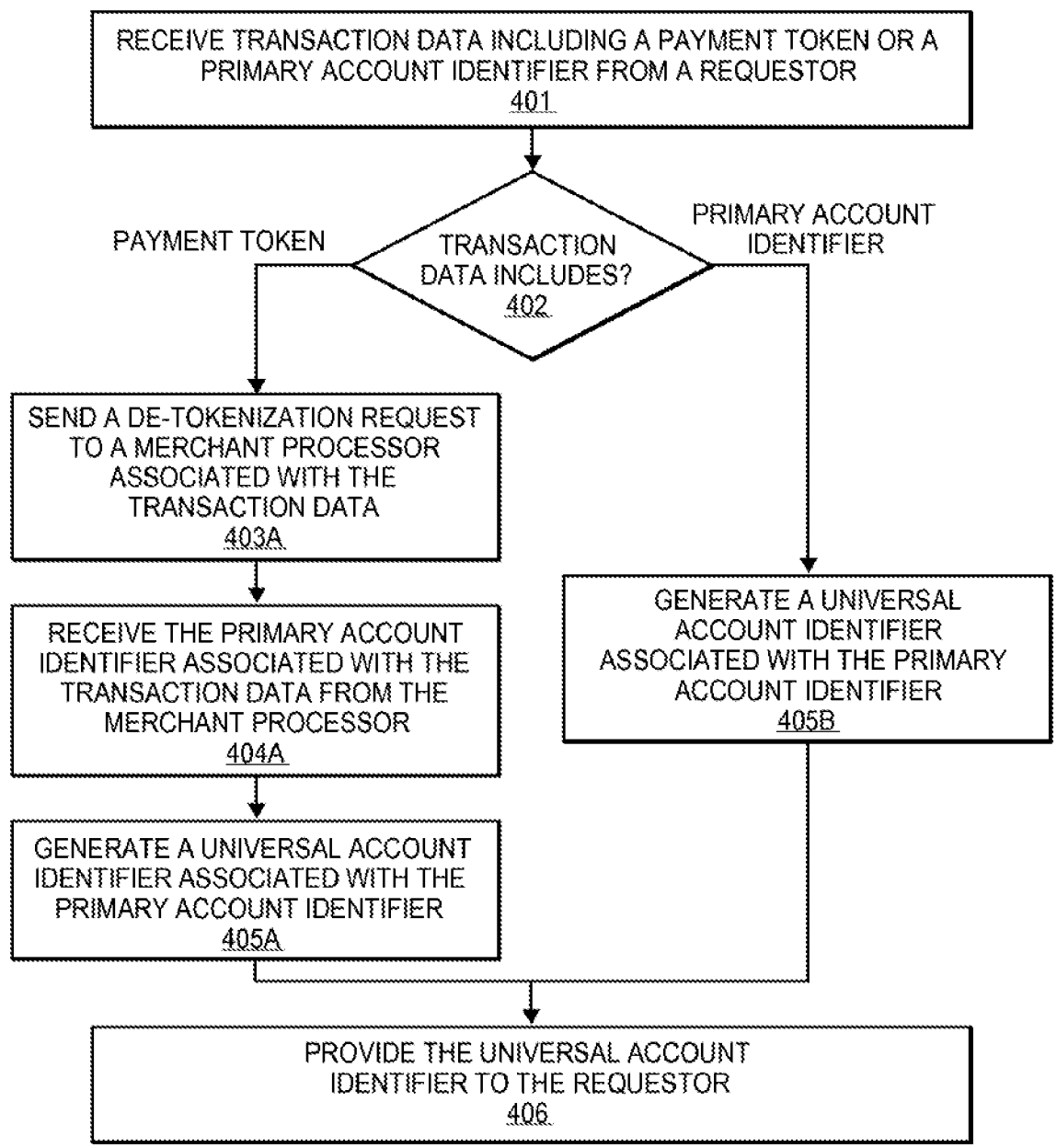
FIG. 4 illustrates an exemplary flow diagram of an exemplary method of generating and providing a universal account identifier to a requester by a universal account identifier system, according to one embodiment of the present invention.

In the system shown in FIG. 3, the merchant e-commerce computer 120A and merchant retail computer 120B complete transactions as described in reference to FIG. 1 and only after receiving an authorization response message for a transaction, does the merchant 120 request a universal account identifier to associate with the transaction data. In FIGS. 3 and 4, like reference numerals designate like elements.

The merchant 120 may comprise an analytics computer and/or database 121 that may comprise a computer that is configured to receive both e-commerce transaction data 310 as well as retail transaction data 320 from the merchant computers 120A/120B, and send universal account identifier request messages 330 for both the retail transaction data and the e-commerce transaction data. The merchant analytics computer 121 may store the e-commerce transaction data and retail transaction data in the merchant analytics database 121. Accordingly, the analytics computer and/or database 121 may comprise transaction data comprising either payment tokens or primary account identifiers. However, because the primary account identifiers and payment tokens may be different even when the same consumer account is used in the e-commerce and retail transactions, the merchant analytics computer and/or database 121 may not associate both e-commerce transactions and retail transactions with the same consumer.

The merchant analytics computer and database 121 comprising the consumer's primary account identifiers and tokenized or hashed primary account payment tokens may send a universal account identifier request message 330 to a universal account identifier generator computer 131 to for both the e-commerce transaction data 310 and retail transaction data 320.

Accordingly, the universal account identifier generator computer 131 may be implemented with a web service interface 330A that accepts either primary account identifier information from retail transactions or tokenized/hashed primary account identifiers (i.e., payment tokens) from e-commerce transactions and returns the universal account identifier for that primary account identifier or payment token in a universal account identifier response message 333. If the universal account identifier generation computer 131 receives a tokenized payment token, the payment token may be de-tokenized such that the universal account identifier relates to the primary account identifier information used during retail transactions. When the universal account identifier generator computer 131 receives tokenized account data in a universal account identifier request message 330 instead of a primary account identifier or account data, the universal account identifier generator computer 131 may call or send a request to the merchant processor to obtain a primary account identifier first. This process is described in further detail in reference to FIG. 4 below.

Additionally, in some embodiments, the universal account identifier generator computer 131 may implement a batch file interface 330B that may accept the primary account identifiers or payment tokens in batch files as well. Batch files comprise many different primary account identifiers or payment tokens and the universal account identifier generation computer 131 may convert all of the many different account numbers or payment tokens (and return them to the merchant 120 in a universal account identifier response message 333) at the same time or piece-meal. Again, the merchant processor may be called to convert the payment tokens to convert the account numbers before generating universal account identifiers (step 403A).

The method steps referenced above, may now be described in further detail by reference to FIGS. 4-5.

II. EXEMPLARY METHODS

FIG. 4 illustrates an exemplary flow diagram of an exemplary method of generating and providing a universal account identifier to a requester by a universal account identifier generator computer 131, according to one embodiment of the present invention.

In step 401, the universal account identifier generator computer 131 receives transaction data including a payment token or a primary account identifier. The request may be provided during a transaction (as shown in FIG. 2) or after a transaction has been completed (as shown in FIG. 3). For example, in some embodiments, a merchant 120 may request universal account identifiers for transaction data in either individual universal account identifier request messages 331A or by batch universal account identifier request messages 331B. For instance, a merchant may periodically (e.g., end of each day, week, quarter, etc.) update an analytics computer and/or database 121 with all of the transactions that have been completed in that period across all of the different payment channels including retail, e-commerce, mobile, etc. and during or after the update, the merchant computer 121 may request universal account identifiers for the underlying transaction data. Accordingly, the merchant 120 may periodically send a batch universal account identifier request message 331B to a universal account identifier generator computer 131 for batch generation of universal account identifiers for a number of different transactions at the same time.

In step 402, the universal account identifier generator computer 131 may determine whether the transaction data includes a payment token or a primary account identifier for each transaction. The contents of the universal account identifier request message may be determined through any suitable method. For example, the universal account identifier generator computer 131 may have a database of primary account identifiers or validated BINs for which primary account identifiers may be recognized. Accordingly, the universal account identifier generator computer 131 may check the database for a matching primary account identifier in the database and if no such match is found, may determine that the information is a payment token. Additionally, in some embodiments, the payment token and the primary account identifiers may have different formats or different numbers of digits. Furthermore, the transaction data may comprise a flag or other identifier that informs the universal account identifier generator computer 131 that the information comprises a payment token or a primary account identifier.

In step 403A, the universal account identifier generator computer 131 may determine that the transaction data includes a payment token and may send a de-tokenization request message to a merchant processor computer 130 associated with the transaction data. The universal account identifier generator computer 131 may determine the appropriate merchant processor computer 130 through any suitable method including that a merchant processor identifier is included in the transaction data, the merchant analytics computer 121 may respond to a request for identifying the relevant merchant processor computer 130, or through any other suitable method.

The merchant processor computer 130 may receive the de-tokenization request message and may determine a primary account identifier associated with the payment token. The merchant processor computer 130 may determine the primary account identifier through any suitable method, including the examples provided above in reference to FIG. 3. The merchant processor computer 130 may determine the primary account identifier associated with the payment token included in the de-tokenization request message and may generate a de-tokenization response message including the primary account identifier. The merchant processor computer 130 may send the de-tokenization response message to the universal account identifier generator computer 131 and may include any other relevant information including any associated transaction data, relevant account information, or any other suitable information.

In step 404A, the universal account identifier generator computer 131 may receive the de-tokenization response message including a primary account identifier associated with the payment token from the merchant processor computer 130. The universal account identifier generator computer 131 may check the validity of the primary account identifier and may store the primary account identifier in a consumer account database for future look-up use (if the payment token may be utilized and associated with the consumer in the future).

In step 405A, the universal account identifier generator computer 131 may generate a universal account identifier by applying a conversion algorithm to the received primary account identifier. The conversion algorithm may generate a universal account identifier that may be cryptographically secure (e.g., a hashable one-way security mechanism) and it may be referentially transparent, meaning that every time a request for a universal account identifier is received including a particular primary account identifier or payment token, the same universal account identifier may be generated and returned to the requester.

For example, using the example above, the primary account identifier (e.g., 1111222233334444) used during the retail transaction where the consumer purchased the shirt may be used to generate a universal account identifier. The conversion algorithm may include, for example, a one-way hash that may generate a universal account identifier of, for example, 1A3B2C4D. The conversion algorithm including, for example, a one-way hash, may ensure that a malicious third party may not be capable of reverse engineering the primary account number if they obtain the universal account identifier. Additionally, the conversion algorithm may be implemented such that anytime that the universal account identifier generator computer 131 receives a request for a universal account identifier request message corresponding to the primary account identifier 1111222233333444, or related payment token 4444333322221111, the conversion algorithm may generate the same universal account identifier (1A3B2C4D) by applying the conversion algorithm to the primary account identifier.

In step 406, the universal account identifier generator computer 131 provides the universal account identifier to the requestor system in the form of a universal account identifier response message. In some embodiments, including those where the universal account identifier request message is sent from the requestor after a transaction has been completed or processed, the requestor may be a merchant analytics computer 121. Alternatively, in other embodiments where the transaction may be in the process of being completed, the requestor may include a merchant processor computer 130, payment processing network computer 150, issuer computer 160, or any other entity within the transaction processing ecosystem 100.

Eventually, the universal account identifier may be stored in a requestor database (e.g., merchant analytics database 121 or other consumer database) and may be used to match transaction data across a broad number of payment channels. For example, the methods and systems can be used to match e-commerce and physical point-of-sale (POS) transaction data that is associated with a single underlying account so that a merchant 120 can perform data analytics, fraud analytics, and/or other processing on that account. For example, a merchant 120 may be able to better determine the risk that a transaction is fraudulent when the merchant 120 has a single database with all of a consumer's transactions across multiple payment channels correlated and identified. For instance, a merchant 120 may be able to determine a consumers transaction patterns and analyze current behavior versus their past behavior to determine whether the merchant should decline or investigate a purchase transaction. This is one exemplary use of embodiments of the present invention and one of ordinary skill would understand many different possible uses for the universal account identifier. Similar processes could be used to identify changing consumer behavior in relation to buying patterns, interests, and overall engagement with the merchant in order to better understand the consumer's needs and interests.

Additionally, as can be seen in FIG. 4, if the transaction data includes a primary account identifier, the process of determining and requesting a de-tokenization of the payment token is not necessary and the universal account identifier generator computer 131 may generate a universal account identifier using the information contained in the universal account identifier request message.

Accordingly, in step 405B, the universal account identifier generator computer 131 determines that the transaction data includes a primary account identifier and the universal account identifier generator computer 131 generates a universal account identifier. The universal account identifier may be generated through any suitable manner and may include applying a conversion algorithm to the primary account identifier to generate a repeatable and reproducible universal account identifier.

Additionally, as some examples showed in FIGS. 2 and 3, number of changes may be introduced into the flow diagram described above depending on the embodiment of the present invention being implemented. Any other alterations of the process described above would be understood by one of ordinary skill and embodiments of the present invention may be used before, during, or after a transaction and where a requester may include a merchant computer 120, merchant processor computer 130, acquirer computer 160, payment processing network computer 150, or any other entity within a payment transaction eco-system 100.

Figure 5:
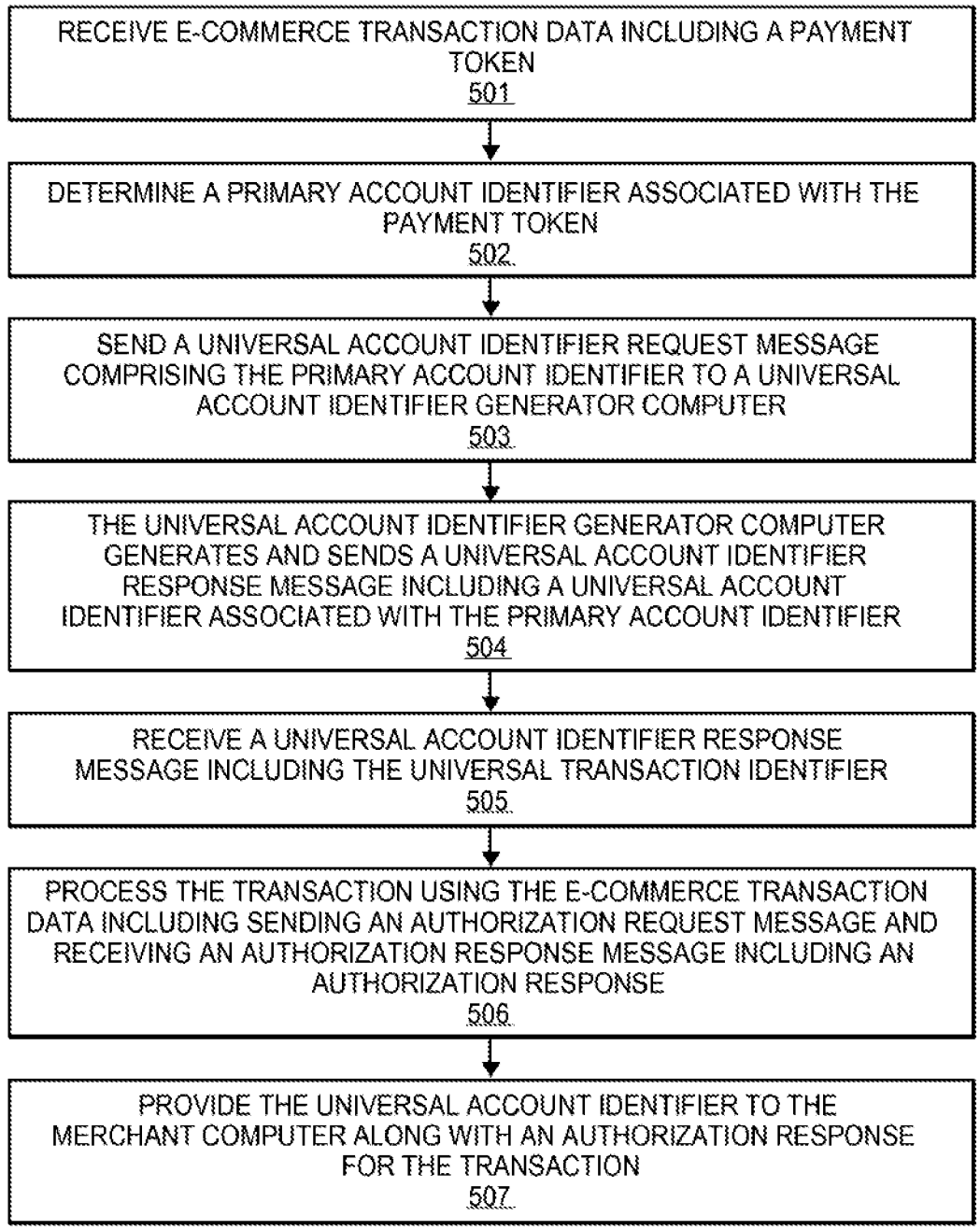
FIG. 5 illustrates an exemplary flow diagram of an exemplary method of requesting and receiving a universal account identifier during the processing of an e-commerce transaction by a merchant processor, according to one embodiment of the present invention.

FIG. 5 illustrates an exemplary flow diagram of an exemplary method of requesting and receiving a universal account identifier during the processing of an e-commerce transaction by a merchant processor computer 130, according to one embodiment of the present invention.

In step 501, the merchant processor computer 130 may receive e-commerce transaction data including a payment token. In step 502, the merchant processor computer 130 may determine a primary account identifier associated with the payment token. These steps are described in further detail above in reference to a typical e-commerce transaction processing method.

In step 503, the merchant processor computer 130 may send a universal account identifier request message comprising the primary account identifier to a universal account identifier generator computer 131. The merchant processor computer 130 may submit the universal account identifier requests for all merchants in which they process transactions, or in other embodiments, the merchant processor computer 130 may have specialized processing methods for individual merchants. Either way, the merchant processor computer 130 may determine that the merchant e-commerce computer 120A may benefit from or is requesting a universal account identifier and may submit such a request to the universal account identifier generator computer 131.

In step 504, the universal account identifier generator computer 131 generates and sends a universal account identifier associated with the primary account identifier to the merchant processor computer 130 in a universal account identifier response message. The steps and methods performed by the universal account identifier generator computer 131 are described in further detail above in reference to the description of FIG. 4.

In step 505, the merchant processor computer 130 receives the universal account identifier response messaging including the universal account identifier. In step 506, the merchant processor computer 130 processes the transaction using the transaction data. Processing the transaction may include sending an authorization request message to an acquirer computer 140, payment processing network computer 150, and subsequently an issuer computer 160 of an issuer of the consumer account associated with the received payment token. The merchant processor computer 130 may then receive an authorization response message that may be generated by the issuer computer 160 and routed through the payment processing network computer 150 and acquirer computer 140 and may determine whether a transaction is authorized.

In step 507, the merchant processor computer 130 may provide the universal account identifier to the merchant e-commerce computer 120A along with an authorization response message associated with the transaction. Accordingly, the merchant e-commerce computer 120A may determine both the result of the transaction authorization request and the universal account identifier associated with the transaction. The merchant e-commerce computer 120A may thereafter store the universal account identifier in a merchant analytics database 121 and thus, may have a universal account identifier instead of, or in addition to, a payment token. Accordingly, the merchant 120 may be able to match transactions processed through third party service providers incorporating tokenization schemes that the consumer may not have access to using a universal account identifier.

Additionally, the merchant analytics computer and/or database 121 may receive the universal account identifier for retail transactions as explained previously in reference to FIG. 2. Accordingly, the merchant 120 may be able to store both e-commerce and retail transactions in a central merchant analytics computer 121 that has a consumer's full transaction history. Additionally, the merchant 120 may be capable of matching e-commerce and retail transaction data during transaction processing and may use a consumer's full transaction history to make decisions regarding a transaction including providing value added services, fraud decisions, generate, track, and apply loyalty and offer information, or complete any other transaction decisions.

A number of additional embodiments may be implemented and the above described method is only one embodiment of the present invention. For example, in one specific embodiment, the universal account identifier may only be provided to the merchant e-commerce computer 120A if the transaction is authorized. Additionally, in other embodiments, the universal account identifier may be returned to the merchant e-commerce computer 120A before the transaction is completed.

IV. EXEMPLARY COMPUTER SYSTEM

Figure 6:
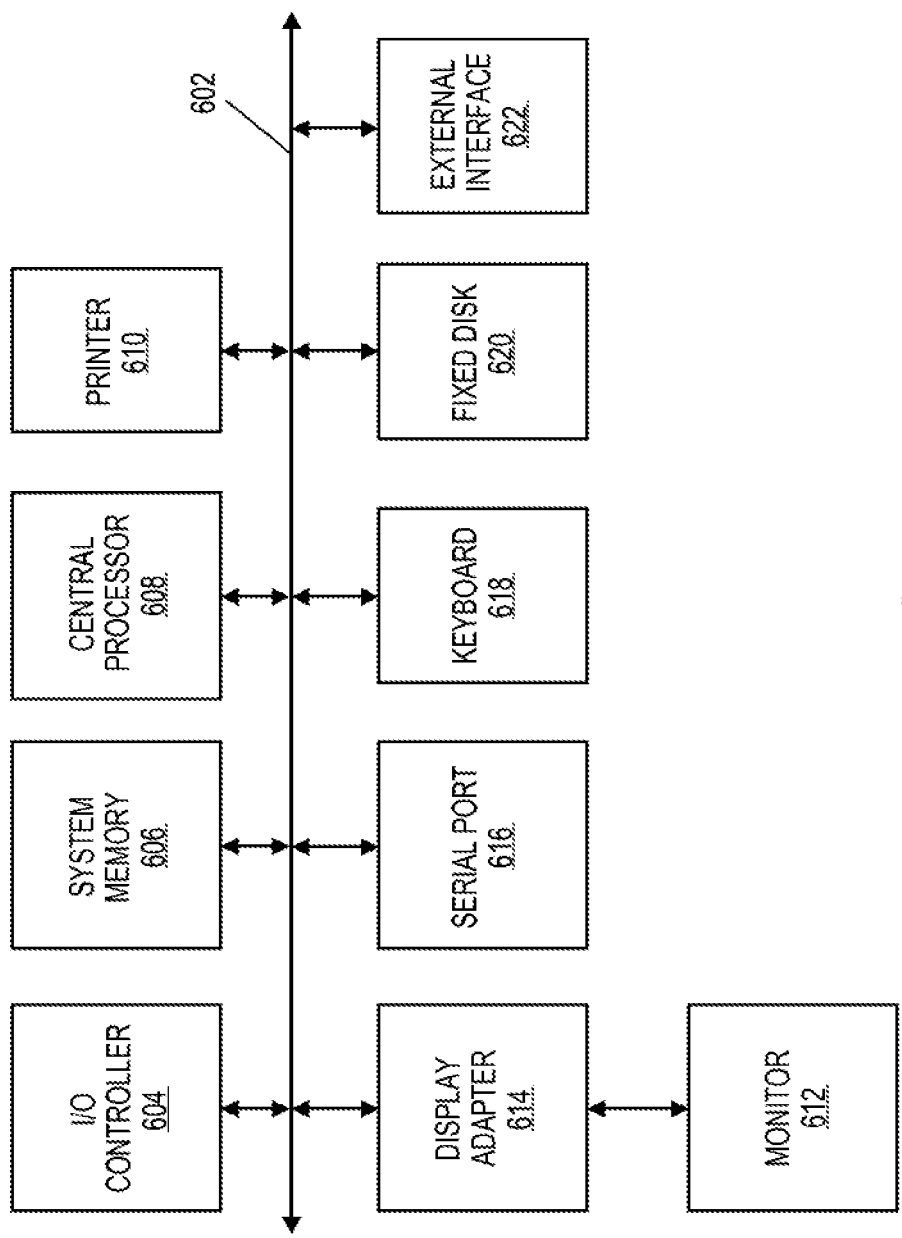
FIG. 6 illustrates a block diagram of a computer apparatus.

The various participants and elements in FIGS. 1-3 may operate one or more computer apparatuses (e.g., a server computer) to facilitate the functions described herein. Any of the elements in FIGS. 1-3 may use any suitable number of subsystems to facilitate the functions described herein. Examples of such subsystems or components are shown in FIG. 6. The subsystems such as a printer 608, keyboard 616, fixed disk 618 (or other memory comprising computer readable media), monitor 612, which is coupled to a display adapter 610, and others are shown. Peripherals and input/output (I/O) devices, which couple to I/O controller 602, can be connected to the computer system by any number of means known in the art, such as serial port 614. For example, serial port 614 or external interface 620 can be used to connect the computer apparatus to a wide area network such as the Internet, a mouse input device, or a scanner. The interconnection via system bus allows the central processor 606 to communicate with each subsystem and to control the execution of instructions from system memory 604 or the fixed disk 618, as well as the exchange of information between subsystems.

Specific details regarding some of the above-described aspects are provided below. The specific details of the specific aspects may be combined in any suitable manner without departing from the spirit and scope of embodiments of the invention.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary.

What is claimed is:

1. A server computer comprising:
a processor; and
a computer-readable medium coupled to the processor, the computer-readable medium comprising code executable by the processor for performing a method, the method comprising:
receiving first transaction data comprising a payment token or second transaction data comprising a primary account identifier from a merchant computer, wherein the payment token is generated for a transaction involving the primary account identifier;
determining a universal account identifier associated with the payment token or the primary account identifier, wherein the universal account identifier is associated with both the payment token and the primary account identifier, and wherein the universal account identifier is generated by applying a conversion algorithm to the received primary account identifier; and
providing the universal account identifier to the merchant computer after receiving the payment token or the primary account identifier, wherein the universal account identifier is a substitute for the payment token and the primary account identifier, and wherein the payment token, the primary account identifier, and the universal account identifier are associated with a same account at an issuer.

2. The server computer of claim 1,
wherein receiving the first transaction data comprising the payment token or the second transaction data comprising the primary account identifier, comprises receiving the first transaction data comprising the payment token,
wherein determining the universal account identifier associated with the payment token or the primary account identifier, comprises determining the universal account identifier associated with the payment token; and
wherein providing the universal account identifier after receiving the payment token or the primary account identifier, comprises providing the universal account identifier after receiving the payment token, and wherein the method further comprises:
receiving-second transaction data comprising the primary account identifier;
determining the universal account identifier associated with the primary account identifier; and
providing the universal account identifier after receiving the primary account identifier.

3. The server computer of claim 1, wherein the receiving, determining, and providing are performed during a payment transaction conducted using the payment token or the primary account identifier.

4. The server computer of claim 1, wherein the receiving, determining, and providing are performed after a payment transaction conducted using the payment token or the primary account identifier.

5. The server computer of claim 2, wherein determining the universal account identifier after receiving the payment token further comprises:
sending a de-tokenization request to a merchant processor associated with the first transaction data; and
receiving the primary account identifier associated with the first transaction data from the merchant processor.

6. The server computer of claim 5, wherein the conversion algorithm produces a unique and repeatable universal account identifier for the primary account identifier.

7. The server computer of claim 1, wherein the universal account identifier is stored at a merchant analytics database, and wherein the universal account identifier is associated with a consumer's e-commerce transactions and retail transactions.

8. A method comprising:
receiving, by a computer, first transaction data comprising a payment token or second transaction data comprising a primary account identifier from a merchant computer, wherein the payment token is generated for a transaction involving the primary account identifier; and
determining, by the computer, a universal account identifier associated with the payment token or the primary account identifier, wherein the universal account identifier is associated with both the payment token and the primary account identifier, and wherein the universal account identifier is generated by applying a conversion algorithm to the received primary account identifier; and
providing, by the computer, the universal account identifier to the merchant computer after receiving the payment token or the primary account identifier, wherein the universal account identifier is a substitute for the payment token and the primary account identifier, and wherein the payment token, the primary account identifier, and the universal account identifier are associated with a same account at an issuer.

9. The method of claim 8,
wherein receiving, by the computer, the first transaction data comprising the payment token or the second transaction data comprising the primary account identifier, comprises receiving the first transaction data comprising the payment token, and
wherein determining, by the computer, the universal account identifier associated with the payment token or the primary account identifier, comprises determining the universal account identifier associated with the payment token; and
wherein providing, by the computer, the universal account identifier after receiving the payment token or the primary account identifier, comprises providing, by the computer, the universal account identifier after receiving the payment token, and wherein the method further comprises:
receiving, by the computer, the second transaction data comprising the primary account identifier;
determining, by the computer, the universal account identifier associated with the primary account identifier; and
providing, by the computer, the universal account identifier after receiving the primary account identifier.

10. The method of claim 8, wherein the receiving, determining, and providing are performed during a payment transaction conducted using the payment token or the primary account identifier.

11. The method of claim 8, wherein the receiving, determining, and providing are performed after a payment transaction conducted using the payment token or the primary account identifier.

12. The method of claim 9, wherein determining, by the computer, the universal account identifier after receiving the payment token further comprises:

sending a de-tokenization request to a merchant processor associated with the first transaction data; and receiving the primary account identifier associated with the first transaction data from the merchant processor.

13. The method of claim 12, wherein the conversion algorithm produces a unique and repeatable universal account identifier for the primary account identifier.

14. The method of claim 8, wherein the universal account identifier is stored at a merchant analytics database, and wherein the universal account identifier is associated with a consumer's e-commerce transactions and retail transactions.

15. A server computer comprising:

a processor; and a computer-readable medium coupled to the processor, the computer-readable medium comprising code executable by the processor for performing a method, the method comprising:

receiving e-commerce transaction data including a payment token from a merchant computer, wherein the payment token is generated for an e-commerce transaction involving a primary account identifier;

determining the primary account identifier associated with the payment token;

determining a universal account identifier associated with the primary account identifier, wherein the universal account identifier is associated with both the payment token and the primary account identifier, and wherein the universal account identifier is generated by applying a conversion algorithm to the received primary account identifier; and sending the universal account identifier to the merchant computer, wherein the merchant computer stores the universal account identifier in a database comprising the e-commerce transaction data and retail transaction data, wherein the universal account identifier is a substitute for the payment token and the primary account identifier, and wherein the payment token, the primary account identifier, and the universal account identifier are associated with a same account at an issuer.

16. The server computer of claim 15, wherein determining the universal account identifier associated with the primary account identifier further comprises:

sending a universal account identifier request message comprising the primary account identifier; and receiving a universal account identifier response message comprising the universal account identifier.

17. A method comprising:

receiving, by a computer, e-commerce transaction data including a payment token from a merchant computer, wherein the payment token is generated for an e-commerce transaction involving a primary account identifier;

determining, by the computer, the primary account identifier associated with the payment token;

determining, by the computer, a universal account identifier associated with the primary account identifier, wherein the universal account identifier is associated with both the payment token and the primary account identifier, and wherein the universal account identifier is generated by applying a conversion algorithm to the received primary account identifier; and sending, by the computer, the universal account identifier to the merchant computer, wherein a merchant stores the universal account identifier in a database comprising the e-commerce transaction data and retail transaction data, wherein the universal account identifier is associated with a consumer's e-commerce transaction data and retail transaction data, wherein the universal account identifier is a substitute for the payment token and the primary account identifier, and wherein the payment token, the primary account identifier, and the universal account identifier are associated with a same account at an issuer.

18. The method of claim 17, wherein determining, by the computer, the universal account identifier associated with the primary account identifier further comprises:

sending, to a server computer, a universal account identifier request message comprising the primary account identifier; and receiving, by the computer, a universal account identifier response message comprising the universal account identifier.

* * * * *